(12) United States Patent
Kaneda et al.

(10) Patent No.: US 7,986,595 B2
(45) Date of Patent: Jul. 26, 2011

(54) OPTICAL PICKUP AND OPTICAL DEVICE FOR THREE DIFFERENT TYPES OF OPTICAL DISCS

(75) Inventors: Kazumasa Kaneda, Kanagawa (JP); Yoshito Asoma, Saitama (JP); Kazuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 12/245,847

(22) Filed: Oct. 6, 2008

(65) Prior Publication Data

US 2009/0135705 A1 May 28, 2009

(30) Foreign Application Priority Data

Nov. 22, 2007 (JP) ................. 2007-303608

(51) Int. Cl.
*G11B 7/135* (2006.01)
*G11B 7/00* (2006.01)
(52) U.S. Cl. ............... 369/44.23; 369/112.03
(58) Field of Classification Search .......... 369/44.11, 369/44.13–44.14, 44.23–44.24, 44.26–44.27, 369/44.32–44.33, 47.55, 112.01, 112.03, 369/112.23–112.26
See application file for complete search history.

(56) References Cited

U.S. PATENT DOCUMENTS

| | | | | |
|---|---|---|---|---|
| 5,563,869 A | * | 10/1996 | Horimai et al. | 369/13.32 |
| 5,818,809 A | * | 10/1998 | Arai et al. | 369/112.24 |
| 2004/0213131 A1 | * | 10/2004 | Kimura et al. | 369/112.03 |
| 2005/0180294 A1 | * | 8/2005 | Kimura et al. | 369/112.05 |
| 2006/0126673 A1 | * | 6/2006 | Nagatomi et al. | 372/9 |
| 2007/0242591 A1 | * | 10/2007 | Ikenaka | 369/112.03 |

FOREIGN PATENT DOCUMENTS

JP 2007-220215 8/2007
WO WO 2005119668 A1 * 12/2005

* cited by examiner

*Primary Examiner* — Wayne R Young
*Assistant Examiner* — Nathan A Danielsen
(74) *Attorney, Agent, or Firm* — Oblon, Spivak, McClelland, Maier & Neustadt, L.L.P.

(57) ABSTRACT

An optical pickup for performing recording and/or playback of information by selectively irradiating the corresponding wavelength optical beam to first through third optical discs having a protection layer with different thickness, includes emission units for emitting first-wavelength through third-wavelength optical beams corresponding to the respective optical discs respectively, a condensing optical device for condensing each wavelength optical beam on an optical disc signal recording face, a divergence angle transformation device, which can be moved in the optical axis direction, for transforming the divergence angle of each wavelength optical beam according to the moved position in the optical axis direction so as to obtain a predetermined divergence angle, and a detector having a common light receiving unit for receiving each wavelength optical beam separated by an optical path separating unit and returned, with the condensing optical device condensing each wavelength optical beam on the corresponding optical disc signal recording face appropriately.

12 Claims, 12 Drawing Sheets

$$\frac{1}{f'} = \frac{1}{f1} + \frac{1}{f2} - \frac{d}{f1f2}$$

OPTICAL PICKUP AND OPTICAL DEVICE FOR THREE DIFFERENT TYPES OF OPTICAL DISCS

CROSS REFERENCES TO RELATED APPLICATIONS

The present invention contains subject matter related to Japanese Patent Application JP 2007-303608 filed in the Japanese Patent Office on Nov. 22, 2007, the entire contents of which are incorporated herein by reference.

BACKGROUND OF THE INVENTION

1. Field of the Invention

The present invention relates to an optical pickup for performing recording and/or playback of an information signal as to different three types of optical discs, and an optical disc device employing the same.

2. Description of the Related Art

In recent years, an optical disc capable of high-density recording (hereafter, referred to as "high-density recording optical disc") wherein recording/playback of a signal is performed by employing an optical beam with a wavelength of 405 nm or so by a blue-violet semiconductor laser has been proposed as a next generation optical disc format. An example of this high-density recording optical disc has been proposed, which has a configuration wherein the thickness of a protection layer (cover layer) for protecting a signal recording layer is made thinner, for example, to 0.1 mm.

When providing an optical pickup compatible with these high-density recording discs, an optical disc having compatibility with optical discs having a different format such as a CD (Compact Disc) with a use wavelength of 785 nm or so, DVD (Digital Versatile Disc) with a use wavelength of 655 nm or so, and so forth, according to the related art has been desired. Thus, there has been demand for an optical pickup and optical disc device having compatibility with optical discs having formats wherein the disc configuration and accordingly laser specifications thereof differ.

Incidentally, each of optical discs such as the above-mentioned high-density recording optical disc, DVD, CD, and so forth has a standard (format) for protecting the uniformity and compatibility of pervasive media and devices for recording/playing these. With these written standards (format books), various requirements are described regarding product technology, but in order to realize so-called three-wavelength compatibility for realizing recording or playback of an information signal as to different three types of optical discs such as described above, it is particularly important to satisfy requirements regarding servo signals for focus servo or the like, which is one of the described items thereof.

In the case of performing such three-wavelength compatibility, it is desirable to realize a system compatible with high-density recording optical discs in addition to an existing system compatible with optical discs such as DVD, CD, and so forth, and accordingly, it is desirable to satisfy the requirement specifications of a focus error signal suitable for focus servo compatible with multiple types of formats. According to the difference between optical disc specifications determined with such multiple types of formats, the requirement specifications of a focus error signal suitable for focus servo compatible with each optical disc format differ.

In particular, the waveform of a focus error signal has close ties to the optical system and electric system of an optical pickup, an indication such as a sigmoid pull-in range (hereafter, also referred to as "focus capture range") with the magnification of the return system of the optical system (hereafter, also referred to as "return magnification") is restricted. Subsequently, in a case wherein this focus capture range is not adapted to each optical disc format, there has been a possibility to cause a problem wherein the sensitivity of focus servo deteriorates, defocusing occurs to prevent suitable focus servo, and thus, recording/playback is prevented from being performed in an appropriate manner. In order to provide a suitable focus capture range with each of the three wavelengths as use wavelengths, it is desirable to set the optimal return magnification as to each. The return magnification is determined principally with the focal length of the objective lens, the incident magnification as to the objective lens, and the focal length of an optical component disposed in other return optical systems. In the light of the above description, heretofore, as shown in FIG. 12, there has been employed or studied a method for providing two or more objective lenses of which the focal lengths differ to provide a predetermined return magnification difference between the respective wavelengths, and as shown in FIG. 13, a method for individually disposing multi lenses serving as a coupling lens of which the curvatures differ on an optical path other than a common path of the return system by employing two or more light receiving elements, and so forth. Now, description will be made regarding the configurations of optical pickups shown in FIGS. 12 and 13 which have heretofore been studied.

An optical pickup 130 shown in FIG. 12 realizes recording and/or playback of different types of optical discs by providing two types of objective lenses 134A and 134B, and includes a light source unit 132 such as a laser diode or the like including an emission unit for emitting an optical beam with a wavelength of 785 nm or so as to an optical disc such as CD or the like, and an emission unit for emitting an optical beam with a wavelength of 655 nm or so as to an optical disc such as DVD or the like, a light source unit 131 such as a laser diode or the like including an emission unit for emitting an optical beam with a wavelength of 405 nm as to a high-density recording optical disc, an objective lens 134B for optical disc such as DVD, CD, or the like, and an objective lens 134A for high-density recording optical disc. Also, this optical pickup 130 includes collimator lenses 137A and 137B, ¼ wavelength plates 145A and 145B, redirecting mirrors 146A and 146B, beam splitters 138 and 139, gratings 143 and 144, detector 141, multi lens 142, and so forth.

An optical beam with a wavelength of 785 nm or so emitted from the light source unit 132 transmits the beam splitters 138 and 139, and is input to the objective lens 134B. The optical beam is condensed on a signal recording face of an optical disc having a protection layer (cover layer) with thickness of 1.1 mm by the objective lens 134B.

Similarly, an optical beam with a wavelength of 655 nm or so emitted from the light source unit 132 is input to the objective lens 134B through the same optical path, and is condensed on a signal recording face of an optical disc having a protection layer with thickness of 0.6 mm. The return light with a wavelength of 785 nm and the return light with a wavelength of 655 nm which are reflected at the signal recording faces of the optical discs are detected by the detector 141 including a photodetector or the like through the beam splitter 139.

An optical beam with a wavelength of 405 nm or so emitted from the light source unit 131 is reflected at the beam splitter 138, and is input to the objective lens 134A through the beam splitter 139. The optical beam is condensed on a signal recording face of an optical disc having a protection layer with thickness of 0.1 mm by the objective lens 134A. The return light with a wavelength of 405 nm reflected at the signal recording face of the optical disc is detected by the detector 141 through the beam splitter 139.

With the return system of the optical pickup 130, the focal lengths and so forth of the objective lens 134B for DVD/CD and the objective lens 134A for high-density recording optical disc are adjusted as appropriate, whereby the return magnifications of the optical beams with a wavelength of 785 nm and wavelength of 655 nm for optical disc such as DVD, CD, and so forth, and the return magnification of the optical beam with a wavelength 405 nm for high-density recording optical disc can be set, and a focus capture range suitable for each of the wavelengths can be provided.

With the optical pickup 130 such as shown in FIG. 12, the two types of objective lenses of the above-mentioned objective lens 134B for DVD/CD, and the objective lens 134A for high-density recording optical disc are provided, thereby realizing recording and/or playback of different three types of optical discs, and also setting a focus capture range suitable for each of the optical discs, i.e., realizing compatibility between multiple types of optical discs.

However, with the optical pickup 130 shown in FIG. 12, the number of components increases, and the two objective lenses 134A and 134B are implemented in an actuator for driving objective lenses, thereby causing a problem such as increase in the weight of the actuator, deterioration in the sensitivity, and so forth. On the other hand, in order to eliminate such a problem, there has been studied an optical pickup 160 shown in FIG. 13 having a common objective lens compatible with three-wavelength optical beams.

The optical pickup 160 shown in FIG. 13 includes a light source unit 163 such as a laser diode or the like including an emission unit for emitting an optical beam with a wavelength of 785 nm or so as to an optical disc such as CD or the like, a light source unit 162 such as a laser diode or the like including an emission unit for emitting an optical beam with a wavelength of 655 nm or so as to an optical disc such as DVD or the like, a light source unit 161 such as a laser diode or the like including an emission unit for emitting an optical beam with a wavelength of 405 nm as to a high-density recording optical disc, a common objective lens 164 for DVD and CD, and a diffraction optical device 165 for aberration correction.

Also, this optical pickup 160 includes a movable collimator lens 167, ¼ wavelength plate 175, redirecting mirror 176, beam splitters 168A, 168B, and 169A, gratings 173A, 173B, and 173C, and so forth.

Further, the optical pickup 160 includes a multi lens 172B and detector 171B as a return light detection system for optical disc such as DVD, CD, or the like, a multi lens 172A and detector 171A as a return light detection system for high-density recording optical disc, and a beam splitter 169B for introducing a predetermined optical beam to each of the return light detection systems, within an return optical path.

An optical beam with a wavelength of 785 nm or so emitted by the light source 163 is reflected at the beam splitter 168B, transmits the beam splitter 169A, and inputs to the objective lens 164. The optical beam is condensed on a signal recording face of an optical disc having a protection layer with thickness of 1.1 mm or so by the objective lens 164.

An optical beam with a wavelength of 655 nm emitted from the light source unit 162 is reflected at the beam splitter 168A, transmits the beam splitters 168B and 169A, and inputs to the objective lens 164. The optical beam is condensed on a signal recording face of an optical disc having a protection layer with thickness of 0.6 mm by the objective lens 164. The return light with a wavelength of 785 nm and the return light with a wavelength of 655 nm which are reflected at the signal recording faces of the optical discs are reflected at the beam splitter 169B through the beam splitter 169A, and are detected by the detector 171B including a photodetector or the like through the multi lens 172B.

An optical beam with a wavelength of 405 nm or so emitted from the light source unit 161 is transmitted through the beam splitters 168A, 168B, and 169A, and inputs to the objective lens 164. The optical beam is condensed on a signal recording face of an optical disc having a protection layer with thickness of around 0.1 mm by the objective lens 164. The return light with a wavelength of 405 nm reflected at the signal recording face of the optical disc is transmitted through the beam splitter 169B through the beam splitter 169A, and is detected by the detector 171A including a photodetector and so forth through the multi lens 172A.

With the return system of the optical pickup 160, the focal lengths and locations of the multi lens 172B for DVD/CD and the multi lens 172A for high-density recording optical disc are adjusted as appropriate, whereby the return magnifications of the optical beams with a wavelength of 785 nm and wavelength of 655 nm for optical disc such as DVD, CD, and so forth, and the return magnification of the optical beam with a wavelength 405 nm for high-density recording optical disc can be set, and a focus capture range suitable for each of the wavelengths can be provided.

With the optical pickup 160 such as shown in FIG. 13, the objective lens 164 compatible with three-wavelength optical beams, and diffraction optical device 165 for aberration correction are provided, thereby realizing recording and/or playback of different three types of optical discs, and also setting a focus capture range suitable for each of the optical discs, i.e., realizing compatibility between multiple types of optical discs.

However, with the optical pickup 160 shown in FIG. 13, the number of components is increased by providing two detectors including a light receiving element, thereby causing a problem from the perspective of reduction in costs, and reduction in size. That is to say, with such an optical disc 160, for example, employing the two detectors causes increase in costs, and also a device such as a beam splitter for separating and inputting optical beams corresponding to these detectors is used, also, multiple components such as a multi lens serving as a magnification transformation lens for condensing each optical beam on the light receiving element of each detector are used, and wiring is laid from two places, which causes the configuration to become complex, thereby leading a problem such that the configuration becomes complex as a whole, and also reduction in size of the device is prevented, or the like.

Thus, with the above-mentioned optical pickups shown in FIGS. 12 and 13, there has been a problem wherein the number of components increases, and the optical systems become complex. Also, providing multiple objective lenses or light receiving elements cause problems such as increase in processes for adjusting these, taking a great amount of time for manufacturing an optical pickup, the configuration of the device becoming complex, and impeding reduction in size.

Thus, it has been very difficult to satisfy both of that the return magnification corresponding to each format is optimized from the perspective of setting the focus capture range to a suitable range, and that a common objective lens and common light receiving element is employed as to each use wavelength corresponding to each optical disc, thereby enabling three-wavelength compatibility, reduction in size of the device, and simplification of the configuration thereof.

SUMMARY OF THE INVENTION

It has been found desirable to provide an optical pickup, which performs recording and/or playback as to multiple types of optical discs by employing different three types of wavelengths, standardizes components to enable simplification of the configuration, reduction in size of the device, setting of a suitable focus capture range compatible with each optical disc format, and obtains reduction in size of the configuration, and an appropriate servo signal to enable three-wavelength compatibility, and an optical disc device employing the optical pickup.

According to an embodiment of the present invention, an optical pickup configured to perform recording and/or playback of information by selectively irradiating the corresponding wavelength optical beam as to a first optical disc having a protection layer formed with first thickness, a second optical disc having a protection layer formed with second thickness which is thicker than the first thickness, and a third optical disc having a protection layer formed with third thickness which is thicker than the second thickness, includes: a first emission unit configured to emit a first-wavelength optical beam corresponding to the first optical disc; a second emission unit configured to emit a second-wavelength optical beam which corresponds to the second optical disc, and is longer than the first wavelength; a third emission unit configured to emit a third-wavelength optical beam which corresponds to the third optical disc, and is longer than the second wavelength; a condensing optical device configured to condense each of the first-wavelength through third-wavelength optical beams on the corresponding optical disc signal recording face; a divergence angle transformation device, which is disposed on the optical path between the first through third emission units and the condensing optical device, and is capable of moving in the optical axis direction, configured to transform the divergence angles of the first-wavelength through third-wavelength optical beams according to the moved position in the optical axis direction so as to obtain a predetermined divergence angle; and a detector having a common light receiving unit configured to receive the first-wavelength through third-wavelength optical beams which are returns reflected at the optical discs; wherein the condensing optical device is configured so as to condense the first-wavelength optical beam of which the divergence angle has been transformed into approximate parallel light by the divergence angle transformation device on a signal recording face of the first optical disc in an appropriate manner, condense the second-wavelength optical beam of which the divergence angle has been transformed into diffusion light with a predetermined divergence angle by the divergence angle transformation device on a signal recording face of the second optical disc in an appropriate manner, and condense the third-optical wavelength optical beam of which the divergence angle has been transformed into diffusion light with a predetermined divergence angle by the divergence angle transformation device on a signal recording face of the third optical disc in an appropriate manner.

Also, according to an embodiment of the present invention, an optical disc device includes: a driving unit configured to hold and rotationally drive an optical disc arbitrarily selected from a first optical disc having a protection layer formed with first thickness, a second optical disc having a protection layer formed with second thickness which is thicker than the first thickness, and a third optical disc having a protection layer formed with third thickness which is thicker than the second thickness; and an optical pickup configured to perform recording and/or playback of an information signal by selectively irradiating the corresponding wavelength optical beam on an optical disc rotationally driven by the driving unit, and employs the above-mentioned optical pickup as the optical pickup employed for this optical disc device.

According to the above configuration, with the optical system of an optical pickup which employs a common objective lens compatible with three types of use wavelengths, and a common optical system including a common light receiving element to condense the corresponding wavelength optical beam as to each optical disc, detects reflected light from the optical discs, and performs recording and/or playback of an information signal as to multiple types of optical disc, the magnification of a return system can be optimized according to each of the use wavelengths, thereby enabling a suitable focus capture range compatible with each optical disc format to be set, realizing simplification of the configuration and reduction in size of the device, and also realizing appropriate recording and/or playback as to each optical disc.

BRIEF DESCRIPTION OF THE DRAWINGS

FIGS. 3A and 3B are schematic views for describing that the incident magnification as to a condensing optical device is changed by moving a collimator lens making the optical pickup to which an embodiment of the present invention has been applied, wherein FIG. 3A is a diagram illustrating that a first wavelength optical beam is emitted as parallel light $B_1$ by moving the collimator lens to a first position $P_1$, and FIG. 3B is a diagram illustrating that second and third wavelength optical beams are emitted as diffusion light $B_2$ and $B_3$ by moving the collimator lens to second and third positions $P_2$ and $P_3$;

FIGS. 6A and 6B are diagrams for describing that the focal length of the virtual complex lens is obtained from common multiple lenses, wherein FIG. 6A illustrates the positions of actual lenses, and FIG. 6B illustrates a virtual complex lens of these lenses.

FIGS. 7A through 7C are diagrams illustrating change in the return magnification and the stroke amount of a collimator lens when changing the incident magnification (finite magnification) as to a condensing optical device with second and third wavelengths, wherein FIG. 7A is a diagram illustrating change in a return magnification $M_3$ and stroke amount as to change in an incident magnification with the third wavelength, FIG. 7B is a diagram illustrating change in a return magnification $M_2$ and stroke amount as to change in an incident magnification with the second wavelength, and FIG. 7C is a diagram illustrating change in a return magnification $M_1$ and stroke amount of the first wavelength when changing the incident magnification of the second and/or third wavelength to compare to FIGS. 7A and 7B;

FIGS. 9A and 9B are diagrams for describing an example of the condensing optical device making up the optical pickup to which an embodiment of the present invention has been applied, wherein FIG. 9A is a side view illustrating an example of the condensing optical device made up of the diffraction optical device having a diffraction unit on the incident side, and an objective lens, and FIG. 9B is a side view illustrating an example of the condensing optical device made up of an objective lens wherein a diffraction unit is formed integral with the incident side face;

FIGS. 10A through 10C are diagrams for describing that the condensing position of each wavelength optical beam is changed due to the material dispersion of the collimator lens, and the material dispersion of the multi lens with the optical pickup to which an embodiment of the present invention has been applied, wherein FIG. 10A is a diagram illustrating a condensing position, i.e., condensing state differs with the material dispersion of the collimator lens depending on the case of the first wavelength, and the case of the second and third wavelengths, FIG. 10B is a diagram illustrating a condensing position, i.e., condensing state differs with the material dispersion of the multi lens depending on the case of the first wavelength, and the case of the second and third wavelengths, and FIG. 10C is a diagram illustrating that the condensing position in the case of the second and third wavelengths differs from the condensing position in the case of the first wavelength due to the material dispersion of the collimator lens and multi lens, but these different condensing positions are matched by the incident state at to the collimator lens changing;

DESCRIPTION OF THE PREFERRED EMBODIMENTS

An optical disc device employing an optical pickup to which an embodiment of the present invention has been applied will be described below with reference to the drawings.

Figure 1:
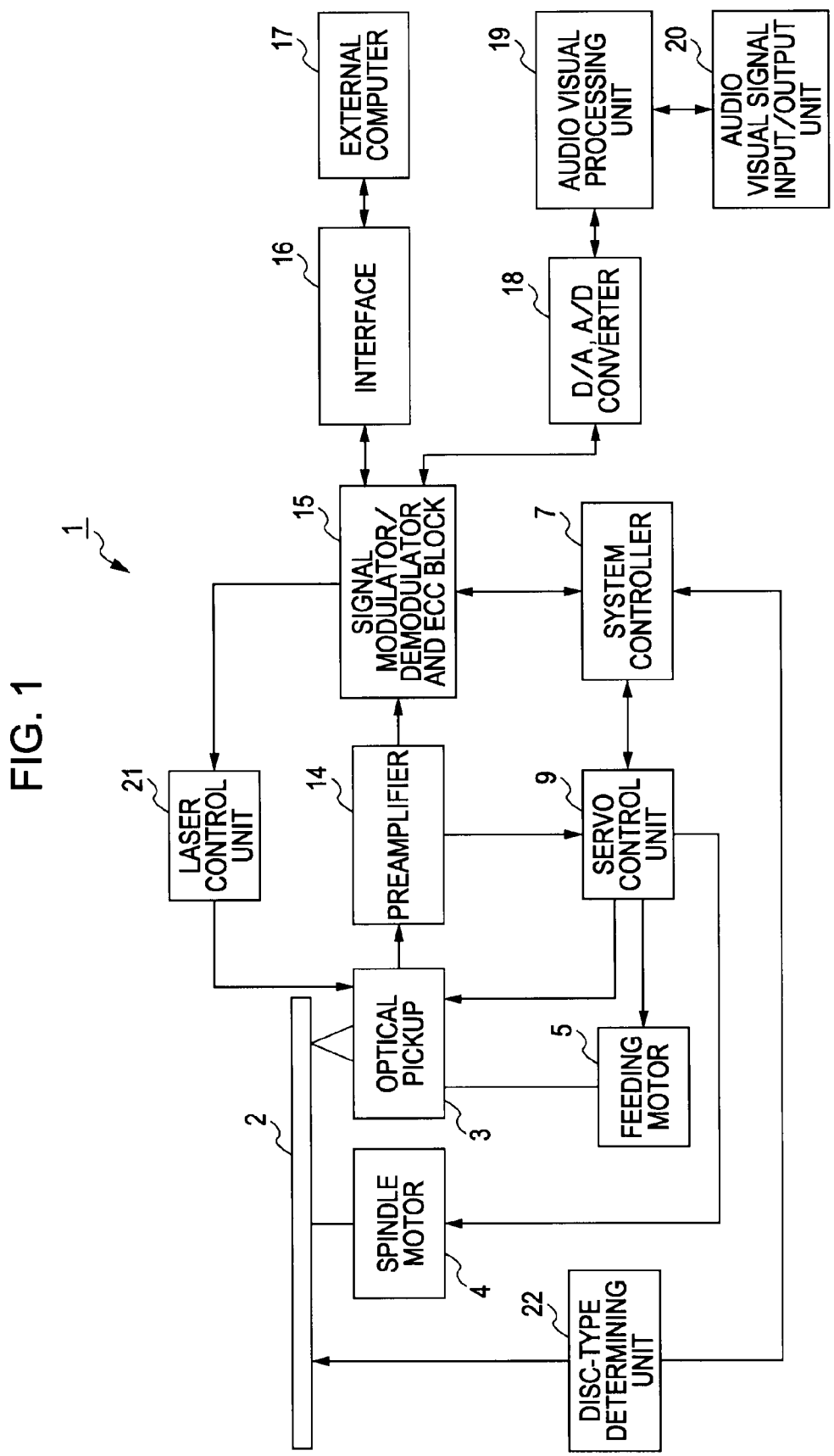
FIG. 1 is a block circuit diagram illustrating an optical disc device to which an embodiment of the present invention has been applied.

An optical disc device 1 to which an embodiment of the present invention has been applied includes, as shown in FIG. 1, an optical pickup 3 for performing recording/playback of information as to an optical disc 2, a spindle motor 4 serving as a driving unit for rotationally operating the optical disc 2, and a sled motor 5 for moving the optical pickup 3 in the diameter direction of the optical disc 2. The optical disc drive 1 is an optical disc device which has realized compatibility between three standards wherein recording and/or playback of information can be performed as to three types of optical disc having a different format, and an optical disc wherein a recording layer has been layered.

Optical discs employed here are, for example, an optical disc employing a semiconductor laser with an emission wavelength of 785 nm or so, such as CD (Compact Disc), CD-R (Recordable), CD-RW (ReWritable), or the like, an optical disc employing a semiconductor laser with an emission wavelength of 655 nm or so, such as DVD (Digital Versatile Disc), DVD-R (Recordable), DVD-RW (ReWritable), DVD+RW (ReWritable), or the like, and a high-density recording optical disc employing a semiconductor laser with a short emission wavelength of 405 nm or so (blue-violet), such as BD (Blu-ray Disc (registered trademark)) capable of high-density recording, or the like.

In particular, description will be made below assuming that a first optical disc 11 such as the above-mentioned BD or the like capable of high-density recording employing an optical beam with a wavelength of 405 nm or so having a protection layer formed with first thickness of 0.1 mm or so as recording/playback light, a second optical disc 12 such as DVD or the like employing an optical beam with a wavelength of 655 nm or so having a protection layer formed with second thickness of 0.6 mm or so as recording/playback light, and a third optical disc 13 such as CD or the like employing an optical beam with a wavelength of 785 nm or so having a protection layer formed with third thickness of 1.1 mm or so as recording/playback light are employed as three types of optical discs 2 for performing playback or recording of information by the optical disc device 1.

With the optical disc device 1, the spindle motor 4 and sled motor 5 are driven and controlled according to a disc type by the servo control unit 9 which is controlled based on a command from the system controller 7 serving as disc type determining unit, and are driven, for example, with a predetermined number of rotations according to the first optical disc 11, second optical disc 12, or third optical disc 13.

The optical pickup 3 is an optical pickup having a three-wavelength compatible optical system, irradiates an optical beam with a different wavelength as to the recording layer of an optical disc having a different standard from the protection layer side, and also detects reflected light with the recording layer of this optical beam. The optical pickup 3 outputs the signal corresponding to each optical beam from the detected reflected light.

The optical disc device 1 includes a preamplifier 14 for generating a focus error signal, tracking error signal, RF signal, or the like based on the signal output from the optical pickup 3, a signal modulator/demodulator and error correction code block (hereafter, referred to as signal modulator/demodulator and ECC block) 15 for demodulating signals from the preamp 14 or modulating signals from an external computer 17 or the like, interface 16, D/A, A/D converter 18, audio visual processing unit 19, and audio visual signal input/output unit 20.

The preamplifier 14 generates a focus error signal by the astigmatic method or the like based on the output from the detector, generates a tracking error signal by the three-beam method, DPD method, DPP method, or the like, and further generates a RF signal, and outputs the RF signal to the signal modulation and ECC block 15. Also, the preamplifier 14 outputs the generated focus error signal and tracking error signal to the servo control unit 9.

When recording data in the first optical disc, the signal modulation and ECC block 15 subjects the digital signal input from the interface 16 or the D/A, A/D converter 18 to error correction processing by an error correction method such as LDC-ECC, BIS, or the like, and subsequently modulation processing such as the 1-7PP method or the like. Also, when recording data in the second optical disc, the signal modulation and ECC block 15 performs error correction processing in accordance with an error correction method such as PC (Product Code) or the like, and subsequently performs modulation processing such as 8-16 modulation or the like. Further, when recording data in the third optical disc, the signal modulation and ECC block 15 performs error correction processing by an error correction method such as CIRC or the like, and subsequently performs modulation processing such as 8-14 modulation processing or the like. Subsequently, the signal modulation and ECC block 15 outputs the modulated data to the laser control unit 21. Further, when performing playback of each optical disc, the signal modulation and ECC block 15 performs demodulation processing based on the RF signal input from the preamplifier 14, and further performs error correction processing, and outputs the data to the interface 16 or the D/A, A/D converter 18.

Note that, when compressing and recording data, a compression/decompression unit may be provided between the signal modulation and ECC block 15 and the interface 16 or D/A, A/D converter 18. In this case, the data is compressed with a method such as MPEG2 or MPEG4.

The focus error signal or tracking error signal is input to the servo control unit 9 from the preamplifier 14. The servo control unit 9 generates a focus servo signal or tracking servo signal so as to eliminate the focus error signal and tracking error signal, and drives and controls an objective lens driving unit such as a biaxial actuator for driving the objective lens based on these servo signals. Also, the servo control unit 9 detects a synchronizing signal or the like from the output from the preamplifier 14, and subjects the spindle motor to servo control by CLV (Constant Linear Velocity) or CAV (Constant Angular Velocity), or further a combination method of these, or the like.

The laser control unit 21 controls the laser light source of the optical pickup 3. In particular, with this specific example, the laser control unit 21 performs control so as to change the output power of the laser light source between recording mode and playback mode. The laser control unit 21 performs control so as to change the output power of the laser light source according to the type of the optical disc 2. The laser control unit 21 switches the laser light source of the optical pickup 3 according to the type of the optical disc 2 detected by a disc-type determining unit 22.

The disc-type determining unit 22 can detect the different formats of the optical disc 2 by detecting change in the amount of reflected light based on the surface reflectance between the first through third optical discs 11, 12, and 13, shape and outer shape differences, or the like.

The respective blocks making up the optical disc device 1 are configured so as to perform signal processing based on the specification of the optical disc 2 to be mounted in accordance with the detection result by the disc-type determining unit 22.

The system controller 7 controls the entire device according to the type of the optical disc determined by the disc-type determining unit 22. Also, the system controller 7 determines the recording position or playback position of the optical disc to be recorded or played based on address information or table of contents (TOC) recorded in a premastered pit or group or the like provided on the innermost circumference of the optical disc, and controls the respective units based on the determined position.

The optical disc device 1 thus configured rotationally operates the optical disc 2 by the spindle motor 4, drives and controls the sled motor 5 according to the control signal from the servo control unit 9, and moves the optical pickup 3 to the position corresponding to a desired recording track of the optical disc 2, thereby performing recording/playback of information as to the optical disc 2.

Specifically, when performing recording and playback by the optical disc device 1, the servo control unit 9 rotates the optical disc 2 by CAV or CLV or a combination of these. The optical pickup 3 irradiates an optical beam from the light source to detect the return optical beam from the optical disc 2 by detector, generates a focus error signal and tracking error signal, drives the objective lens by an objective lens driving mechanism based on these focus error signal and tracking error signal, thereby performing focus servo and tracking servo.

Also, when performing recording by the optical disc device 1, a signal from the external computer 17 is input to the signal modulation/demodulation and ECC block 15 through the interface 16. The signal modulation/demodulation and ECC block 15 adds a predetermined error code such as described above to digital data input from the interface 16 or A/D converter 18, further subjects this data to predetermined modulation processing, and then generates a recording signal. The laser control unit 21 controls the laser light source of the optical pickup 3 to subject a predetermined optical disc to recording based on the recording signal generated at the signal modulation/demodulation and ECC block 15.

Also, when playing the information recorded in the optical disc 2 by the optical disc device 1, the signal modulation/demodulation and ECC block 15 subjects the signal detected at the detector to demodulation processing. When the recorded signal demodulated by the signal modulation/demodulation and ECC block 15 is for data storage, the recorded signal is output to the external computer 17 through the interface 16. Thus, the external computer 17 can operate based on the signal recorded in the optical disc 2. Also, when the recorded signal demodulated by the signal modulation/demodulation and ECC block 15 is for audio visual, the recorded signal is subjected to digital-to-analog conversion by the D/A converter 18, and is supplied to the audio visual processing unit 19. Subsequently, the recorded signal is subjected to audio visual processing by the audio visual processing unit 19, and is output to an unshown external speaker or monitor through the audio visual signal input/output unit 20.

Now, the above-mentioned optical pickup 3 for recording/playback will be described in detail.

Figure 2:
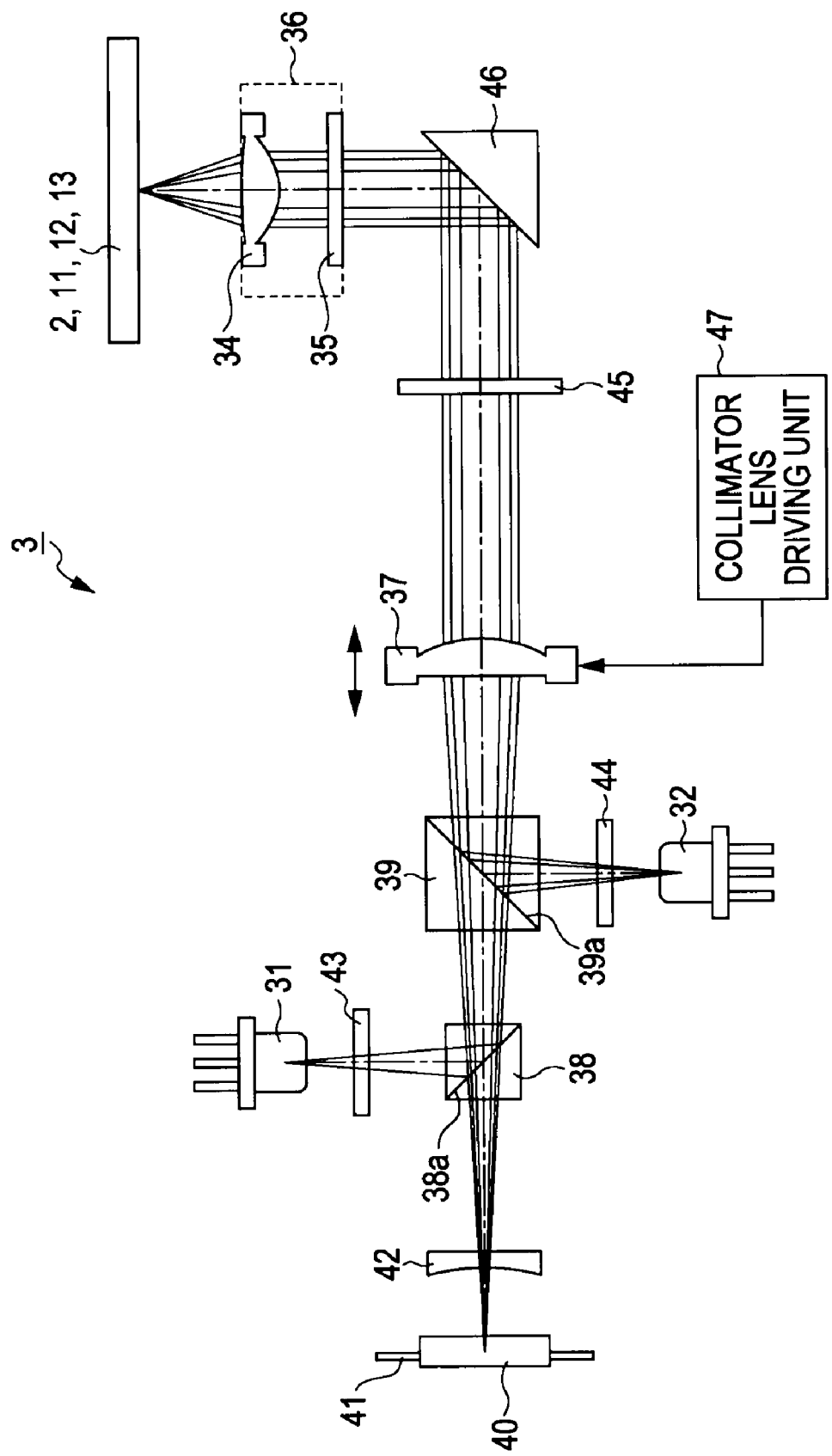
FIG. 2 is an optical path diagram illustrating the optical system of an optical pickup to which an embodiment of the present invention has been applied.

The optical pickup 3 to which an embodiment of the present invention has been applied includes, as shown in FIG. 2, a first light source unit 31 including a first emission unit for emitting a first wavelength optical beam, a second light source unit 32 including a second emission unit for emitting a second wavelength optical beam which is longer than the first wavelength, and a third emission unit for emitting a third wavelength optical beam which is longer than the second wavelength, an objective lens 34 and diffraction optical device 35 making up a condensing optical device 36 for condensing the optical beams emitted from the first through third emission units on the signal recording face of the optical disc 2, and a collimator lens 37 serving as a divergence angle transformation device for transforming the divergence angles of the first-wavelength through third-wavelength optical beams, adjusting these so as to obtain an approximate parallel light state or state having a predetermined divergence angle, and emitting these, which is disposed on the optical path between the first through third emission units and condensing optical device 36, and can move in the optical axis direction.

Also, the optical pickup 3 includes first and second beam splitters 38 and 39 serving as optical path separating units for separating the optical paths of the first-wavelength through third-wavelength optical beams which are returns condensed on the signal recording face of the optical disc 2 by the objective lens 34, and reflected at this signal recording face (hereafter, also referred to as return optical beams), from the outgoing optical paths of the respective optical beams emitted from the first through third emission units, a detector 41 including a common light receiving unit 40 for receiving the return first-wavelength through third-wavelength optical beams separated by the first and second beam splitters 38 and 39, and a multi lens 42 serving as a coupling lens for condensing the return first-wavelength through third-wavelength optical beams from the first beam splitter 38 on the light receiving face of the light receiving unit 40, which is provided between the first beam splitter 38 and light receiving unit 40.

Also, the optical pickup 3 includes a first grating 43, which is provided between the first emission unit of the first light source unit 31 and the first beam splitter 38, diffracts the first-wavelength optical beam emitted from the first emission unit into three beams to detect a tracking error or the like, and a second grating 44, which is provided between the second and third emission units of the second light source unit 32 and the second beam splitter 39, diffracts the second-wavelength and third-wavelength optical beams emitted from the second and third emission units into three beams to detect a tracking error signal or the like.

Further, the optical pickup 3 includes a ¼ wavelength plate 45, which is provided between the collimator lens 37 and objective lens 34, provides a phase difference with a ¼ wavelength to the input first-wavelength through third-wavelength optical beams, and a redirecting mirror 46, which is provided between the objective lens 34 and ¼ wavelength plate 45, reflects and redirects the optical beam passing through the above-mentioned optical components within a plane orthogonal to the optical axes of the objective lens 34 and diffraction optical device 35, thereby emitting the optical beam in the optical axes of the objective lens 34 and diffraction optical device 35.

The first light source unit 31 includes the first emission unit for emitting the optical beam with the first wavelength of around 405 nm as to a first optical disc 11. The second light source unit 32 includes the second emission unit for emitting the optical beam with the second wavelength of around 655 nm as to a second optical disc 12, and the third emission unit for emitting the optical beam with the third wavelength of around 785 nm as to a third optical disc 13. With the second light source unit 32, the second and third emission units are disposed such that each emission point is disposed within the same pale orthogonal to the optical axes of the second-wavelength and third-wavelength optical beams emitted from the second and third emission units. Note here that an arrangement has been made wherein the first emission unit is disposed in the first light source unit 31, and the second and third emission units are disposed in the second light source unit 32, but the present invention is not restricted to this, and an arrangement may be made wherein the first through third emission units are disposed in separate light source units 31, 32, and 33 respectively, but an arrangement wherein the second and third emission units are disposed in the common light source unit, such as described above, is advantageous to simplification of the configuration, and reduction in size of the device.

The first grating 43 is provided between the first light source unit 31 and first beam splitter 38, and diffracts the first-wavelength optical beam emitted from the first emission unit of the first light source unit 31 into three beams to detect a tracking error signal or the like, and emits these to the first beam splitter 38 side.

The second grating 44 is provided between the second light source unit 32 and second beam splitter 39, and diffracts the second-wavelength and third-wavelength optical beams emitted from the second and third emission units of the second light source unit 32 into three beams to detect a tracking error signal or the like, and emits these to the second beam splitter 39 side. The second grating 44 is a so-called two-wavelength grating having wavelength dependence, and has a function for diffracting the second-wavelength and third-wavelength optical beams into predetermined three beams.

The first beam splitter 38 includes a separating face 38a for reflecting the first-wavelength optical beam diffracted and input at the first grating 43 to emit this to the second beam splitter 39 side, and also transmitting the return first-wavelength through third-wavelength optical beams to emit these to the multi lens 42 side. The separating face 38a is formed so as to have wavelength dependence, polarization dependence, and so forth, thereby exhibiting such a function. The first beam splitter 38 serves as an optical path separating unit for separating the optical path of the return first-wavelength optical beam, and the optical path of the outgoing first-wavelength optical beam emitted from the first emission unit through the separating face 38a.

The second beam splitter 39 includes a synthetic separating face 39a for transmitting the outgoing first-wavelength optical beam from the first beam splitter 38 to emit this to the collimator lens 37 side, reflecting the outgoing second-wavelength and third-wavelength optical beams from the second grating 44 to emit these to the collimator lens 37 side, and also transmitting the return first-wavelength through third-wavelength optical beams to emit these to the first beam splitter 38 side. The synthetic separating face 39a is formed so as to have wavelength dependence, polarization dependence, and so forth, thereby exhibiting such a function. The second beam splitter 39 serves as an optical path synthesizing unit for synthesizing the optical path of the outgoing first-wavelength optical beam, and the optical paths of the outgoing second-wavelength and third-wavelength optical beams to guide this to the collimator lens 37 side through the synthetic separating face 39a. Also, the second beam splitter 39 serves as an optical path separating unit for separating the optical paths of the return second-wavelength and third-wavelength, and the optical paths of the outgoing second-wavelength and third-wavelength optical beams emitted from the second and third emission units through the synthetic separating face 39a.

Note that an arrangement has been made here wherein, with the optical pickup 3, the first and second beam splitters 38 and 39 have a function as an optical path separating unit, and the second beam splitter 39 has a function as an optical path synthesizing unit, but the present invention is not restricted to this, and an arrangement may be made wherein there are provided an optical path synthesizing unit for synthesizing the optical paths of the outgoing first-wavelength through third-wavelength optical beams, and an optical path separating unit for separating the optical paths of the return first-wavelength through third-wavelength optical beams from the optical paths of the outgoing first-wavelength through third-wavelength optical beams to guide these to the light receiving unit 40 side.

The collimator 37, which is provided between the second beam splitter 39 and ¼ wavelength 45, and can move in the optical axis direction, serves as a divergence angle transformation device for transforming the divergence angles of the first-wavelength through third-wavelength optical beams so as to obtain a predetermined divergence angle according to the moved position in the optical axis direction. The collimator lens 37 is formed with a material, for example, such as low-Tg optical glass such as S-BSL7 (manufactured by OHARA Inc.) or the like. Also, with the optical pickup 3, there is provided a collimator lens driving unit 47 for driving the collimator lens 37 to move this in the optical axis direction.

Figure 3A:
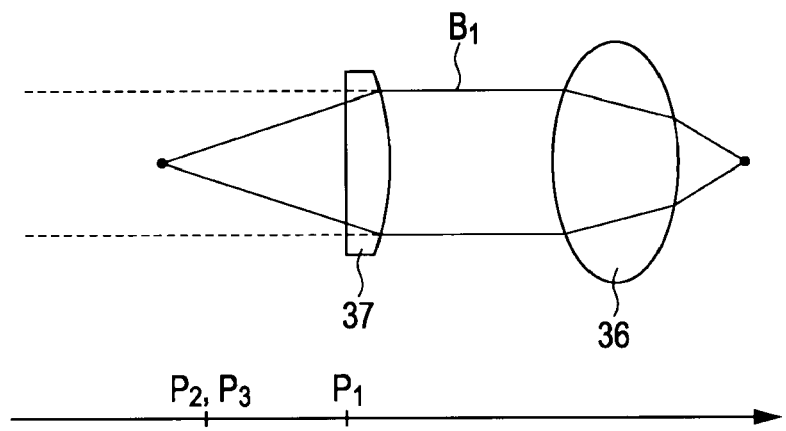
Figure 3B:
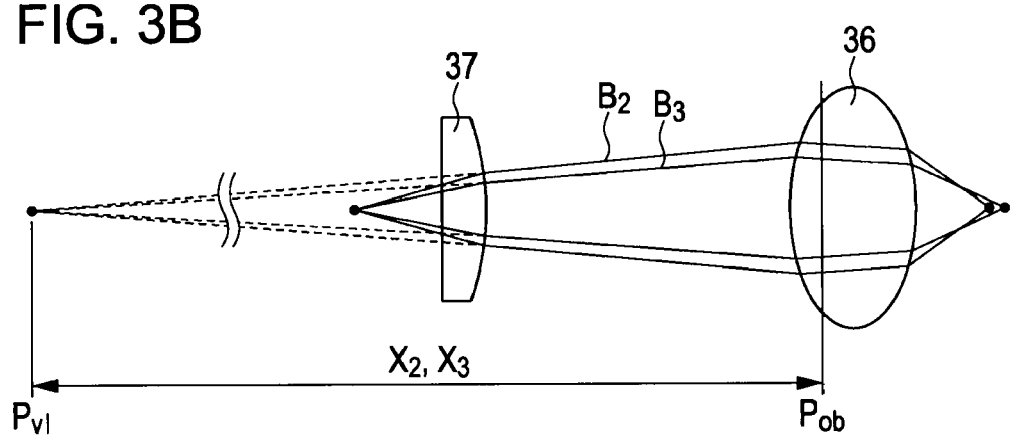

In the case of performing recording/playback as to the first optical disc 11, as shown in FIG. 3A, the collimator lens 37 of the optical pickup 3 is moved by the collimator lens driving unit 47 to a first position $P_1$ where the first-wavelength optical beam can be emitted in a state of parallel light $B_1$ obtained by transforming the divergence angle of the first-wavelength optical beam, and in the case of performing recording/playback as to the second optical disc 12, as shown in FIG. 3B, the collimator lens 37 of the optical pickup 3 is moved by the collimator lens driving unit 47 to a second position $P_2$ where the second-wavelength optical beam can be emitted in a state of later-described diffusion light $B_2$ with a predetermined divergence angle obtained by transforming the divergence angle of the second-wavelength optical beam, and in the case of performing recording/playback as to the third optical disc 13, the collimator lens 37 of the optical pickup 3 is moved by the collimator lens driving unit 47 to a third position $P_3$ where the third-wavelength optical beam can be emitted in a state of later-described diffusion light $B_3$ with a predetermined divergence angle obtained by transforming the divergence angle of the third-wavelength optical beam. Note that the second and third positions $P_2$ and $P_3$ are positions on the light source units 31 and 32 side as compared to the first position $P_1$.

Specifically, the collimator lens 37 transforms the divergence angle of the first-wavelength optical beam to perform adjustment such that the incident magnification as to the condensing optical device 36 made up of the objective lens 34 and so forth becomes $m_1$ satisfying a relational expression shown in the following Expression (1), transforms the divergence angle of the second-wavelength optical beam to perform adjustment such that the incident magnification as to the condensing optical device 36 made up of the objective lens 34 and so forth becomes $m_2$ satisfying a relational expression shown in the following Expression (2) and transforms the divergence angle of the third-wavelength optical beam to perform adjustment such that the incident magnification as to the condensing optical device 36 made up of the objective lens 34 and so forth becomes $m_3$ satisfying a relational expression shown in the following Expression (3).

$$m_1 = 0 \quad (1)$$

$$-1/40 \leq m_2 \leq -1/200 \quad (2)$$

$$-1/40 \geq m_3 \geq -1/200 \quad (3)$$

Now, the incident magnification $m_n$ (where n=1 at the time of the first wavelength, n=2 at the time of the second wavelength, and n=3 at the time of the third wavelength) of each wavelength optical beam as to the condensing optical device 36 can be represented with $m_n = S_{on}/(-X_n)$ when assuming that the focal length of the condensing optical device 36 as to the relevant wavelength optical beam is $S_{on}$ (n=1, 2, and 3) and as shown in FIG. 3B, the distance from a virtual emission position $P_{v1}$ of the diffusion light input to the condensing optical device 36 to a front side principal point (object side principal plane) $P_{ob}$ of the condensing optical device 36 is $X_n$ (n=1, 2, and 3). Note that with FIGS. 3A and 3B and the present description, the focal length $S_{on}$ has been set as the focal length of the condensing optical device 36, but, in reality, means the focal length of the objective lens 34 serving as a refractive lens making up the condensing optical device 36, and similarly, the $P_{ob}$ determining the distance $X_n$ actually means the front side principal point of the objective lens 34. This is because the diffraction optical device 35 serving as another component making up the condensing optical device 36 has no refracting power, and accordingly has no relation with magnification. Also, with the incident magnifications represented with the $m_1$, $m_2$, and $m_3$, in the case of a negative value, an optical beam in a direction apart from the optical axis, i.e., an optical beam in a divergent state is assumed, and in the case of a positive value, an optical beam in a direction approaching the optical axis, i.e., an optical beam in a convergent state is assumed. The later-described condensing optical device 36 is configured such that in a state wherein the first-wavelength through third-wavelength optical beams are input in states represented with the $m_1$, $m_2$, and $m_3$, each of the optical beams can be condensed on the signal recording face of the corresponding optical disc in an appropriate manner. Accordingly, the second-wavelength and third-wavelength optical beams input with the incident magnifications $m_2$ and $m_3$ stipulated with Expression (2) or (3) means that the optical beams are in a finite system and in a divergent state, and the incident magnification $m_1$ stipulated with Expression (1) means that the optical beams are in an infinite system, i.e., in a parallel light state. Note that the objective lens 34 making up the condensing optical device 36 can condense an optical beam on the signal recording face of the corresponding optical disc in an appropriate manner without generating an aberration as to each wavelength optical beam by the diffraction optical device 35 for aberration correction being provided on the incident side thereof, such as described later.

At this time, the collimator lens driving unit 47 is controlled by the system controller 7 in accordance with the type of the optical disc 2 detected by the disc-type determining unit 22, thereby driving the collimator lens 37 to move this to the above-mentioned first through third positions $P_1$, $P_2$, and $P_3$.

Figure 4:
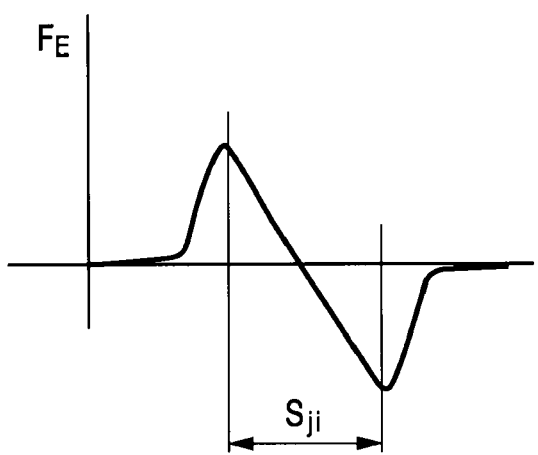
FIG. 4 is a diagram illustrating a relation between the defocus amount of an objective lens and a focus error signal, and a focus capture range.

The optical pickup 3 including such a collimator lens 37 and collimator lens driving unit 47 has an arrangement wherein each wavelength optical beam is condensed on the signal recording face of the corresponding optical disc by employing the common objective lens 34, can set the magnification (hereafter, also referred to as "return magnification") of each wavelength return optical system (return optical system) can be set to a predetermined magnification according to an arrangement wherein the first-wavelength optical beam is input to the objective lens 34 so as to obtain approximate parallel light, and the second-wavelength and third-wavelength optical beams are input to the objective lens 34 so as to obtain diffusion light with a predetermined divergence angle, by changing the position of the collimator lens 37 according to the use wavelength, whereby a focus capture range can be set to a desired value adapted to each format. The term "a predetermined magnification" means a magnification equivalent to a level wherein the focus capture range can be adapted to each format of the first through third optical discs. Also, the term "focus capture range" means a range wherein the actuator can be driven according to the control signal to perform focus operation, and specifically, as shown in FIG. 4, the distance in the horizontal axis direction between sigmoid waveform peaks (hereafter, also referred to as "sigmoid p-p") emerging when the horizontal axis is taken as the defocus amount, and the vertical axis is taken as a focus error signal $F_E$ calculated as described later, i.e., the distance in the horizontal axis direction between the upper limit peak position and lower limit peak position.

Now, description will be made regarding that a focus capture range can be adapted by setting the magnification of a return optical system to a predetermined magnification.

The references of the focus capture ranges of the first through third optical discs such as described above are stipulated with the corresponding format, but it is desirable to set the focus capture range of the first optical disc, which will be set generally in reality, shorter than the focus capture ranges of the second and third optical discs. Also, on the other hand, when assuming that an astigmatic difference is $\Delta$, and the return magnification of the optical system is M, Sigmoid p-p ($S_{ji}$) indicating the above-mentioned focus capture range satisfies a relation of $S_{ji}=\Delta/(2\times M^2)$. Now, the astigmatic difference $\Delta$ means the distance between the focal lines of an anterior focal line and a posterior focal line formed due to astigmatism caused due to the multi lens 42 or the like. Also, the return magnification M is a value calculated with the focal length of an optical component disposed in the return optical system, and so forth, and this point will be described later. In order to set a focus capture range to a desired value, it is desirable at least to set the return magnification $M_1$ of the first-wavelength optical beam as to the first optical disc greater than the return magnifications $M_2$ and $M_3$ of the second-wavelength and third-wavelength optical beams as to the second and third optical discs.

That is to say, as described above, the return magnification of each wavelength optical beam is set to a predetermined value, whereby a desired focus capture range can be obtained for each wavelength optical beam, corresponding to each optical disc.

Note that in Expressions (2) and (3), if the incident magnification is smaller than $-\frac{1}{200}$ which is the upper limit, a predetermined return magnification is obtained, and in other words, this value is a limit value for decreasing the return magnification, and if the incident magnification is greater than this value, a desired return magnification is not obtained, and if the incident magnification is greater than $-\frac{1}{40}$ which is the lower limit, the stroke can be set to a predetermined value or less according to a relation with the stroke amount which is the driving amount in the optical axis direction of the collimator lens 37, and in other words, this value is a limit value for suppressing the stroke amount to a predetermined value or less, if the incident angle is smaller than this value the stroke amount of the collimator lens 37 increases, leading a problem such as increase in size of the device, and further, loss of the optical system balance.

Figure 5:
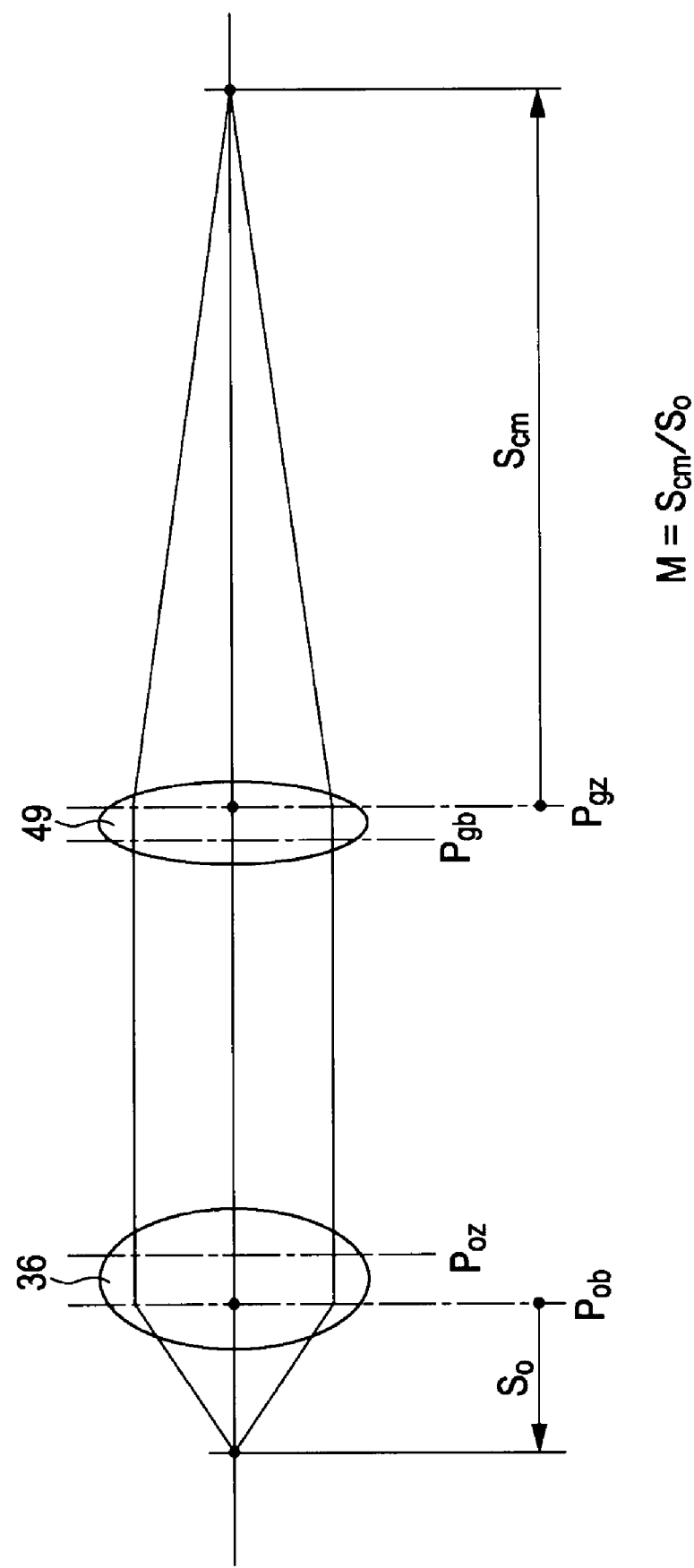
FIG. 5 is a diagram for describing the return magnification with the return optical system of an optical pickup, and is a diagram illustrating a condensing optical device, and a virtual complex lens made up of a collimator lens, multi lens, and so forth.

Also, the return magnification M as to each wavelength is set as follows. With the return optical system, the return magnification M is determined with an optical component for transforming the divergence angle of a passing optical beam, i.e., an optical component having refractive power, with the present example, is determined with the condensing optical device 36, collimator lens 37, and multi lens 42. As shown in FIG. 5, the return magnification M is a value calculated with the following relational expression $M=S_{cm}/S_o$ based on the focal length of the condensing optical device 36 (objective lens 34), and the focal length of the virtual complex lens 49 wherein the collimator lens 37 and multi lens 42 are virtually combined. Here, the $S_{cm}$ and $S_o$ have different distance according to each wavelength. Note that FIG. 5 is a diagram schematically representing the return optical system, wherein $S_o$ denotes the focal length of the condensing optical device 36, $S_{cm}$ denotes the focal length of the virtual complex lens 49, $P_{ob}$ denotes the object side principal plane (front side principal point) of the condensing optical device 36, $P_{oz}$ denotes the image side principal plane (rear side principal point) of the condensing optical device 36, $P_{gb}$ denotes the object side principal plane (front side principal point) of the virtual complex lens 49, and $P_{gz}$ denotes the image side principal plane (rear side principal point) of the virtual complex lens 49. Note that, with the optical pickup 3, the collimator lens 37 and multi lens 42 are disposed as optical components having refractive power in the return optical system, so the return magnification M is calculated by the virtual complex lens 49 wherein these components are virtually combined, but in a case wherein other optical components having refractive power are provided, the focal length of a virtual complex lens obtained by combining all of the optical components having refractive power other than the condensing optical device 36 in the return optical system instead of the above-mentioned virtual complex lens 49 is calculated as follows, whereby the return magnification M can be calculated based on this, as described above.

Now, the values of the $S_o$ and $S_{cm}$ will be studied for each wavelength. First, upon the focal length $S_o$ of the condensing optical device 36 being studied from the perspective of outgoing optical beams as described above, the condensing optical device 36 is configured such that the first-wavelength optical beam is an infinite system (incidence of parallel light), and can be condensed on the signal recording face of the first optical disc appropriately, and such that the second-wavelength and third-wavelength optical beams are finite systems, and can be condensed on the signal recording faces of the second and third optical discs in a divergent state appropriately. In general, with a lens for condensing appropriately the same distance as the distance from a certain lens, the focal length as to the wavelength of an optical beam condensing with incidence in a divergent state appropriately is long as compared to the focal length as to the wavelength of an optical beam condensing with incidence in a parallel state appropriately. Upon applying this to the above-mentioned condensing optical device 36, focal lengths $S_{o2}$ and $S_{o3}$ as to the second-wavelength and third-wavelength optical beams input in a diffusion light state and condensed appropriately are greater than a focal length $S_{o1}$ as to the first-wavelength optical beam input in a parallel light state and condensed appropriately, i.e., the following relational expression $S_{o1}<S_{o2}$, and $S_{o1}<S_{o3}$ are satisfied.

Figure 6A:
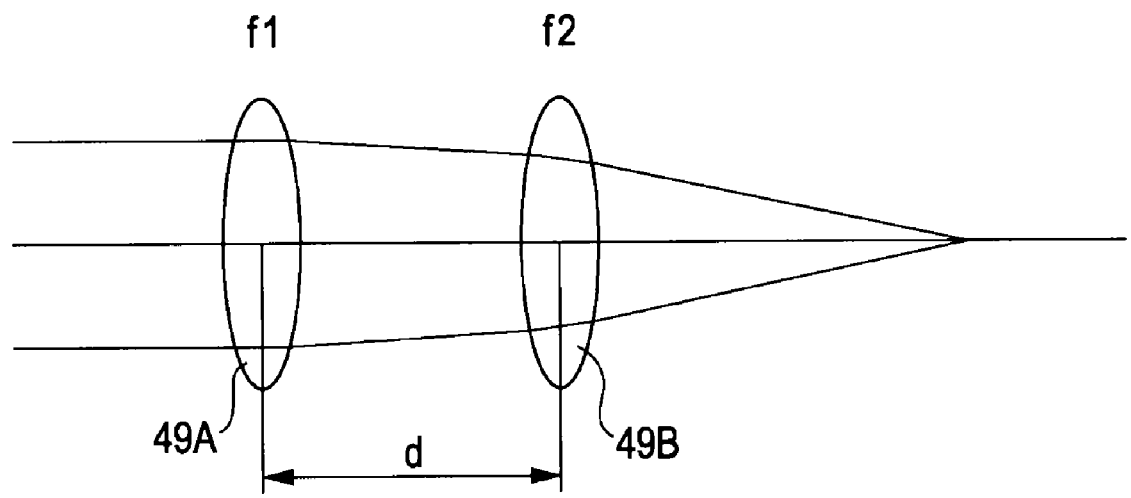
Figure 6B:
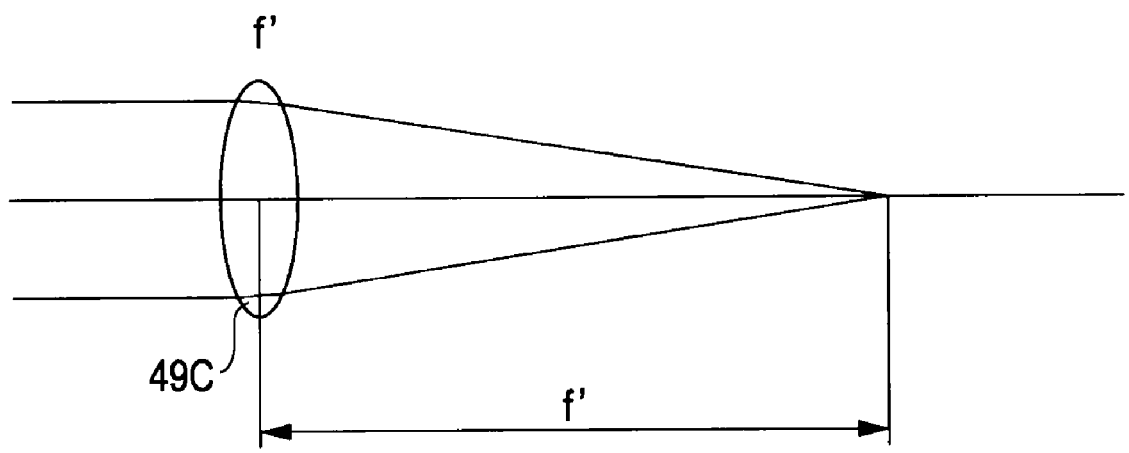

Next, the focal length $S_{cm}$ of the virtual complex lens 49 made up of the collimator lens 37 and multi lens 42 will be studied form the perspective of return optical beams. First, description will be made regarding the focal length of a common virtual complex lens with reference to FIGS. 6A and 6B. When assuming that the focal lengths of two lenses 49A and 49B separated by predetermined distance d in the optical axis direction are f1 and f2, the complex focal length f' of a complex lens 49C of these is calculated with the following Expression (4), and upon modifying this expression, a relational expression such as Expression (5) is obtained.

$$1/f'=(1/f1)+(1/f2)-(d/(f1\times f2)) \qquad (4)$$

$$f'=(f1\times f2)/(f1+f2-d) \qquad (5)$$

Subsequently, upon applying this to the above-mentioned relation between the collimator 37 and multi lens 42, as described above, with regard to the distance between the collimator lens 37 and multi lens 42, distance d2 and d3 in the case of passing through the second-wavelength and third-wavelength optical beams for performing recording/playback as to the second and third optical discs are smaller than distance d1 in the case of passing through the first-wavelength optical beam for performing recording/playback as to the first optical disc. This is, as describe above, because the second and third positions P2 and P3 which are the positions of the collimator lens 37 in the case of the second and third optical discs are moved to the light source units 31 and 32 side as compared to the first position P1 which is the position of the collimator lens 37 in the case of the first optical disc, i.e., the collimator lens 37 is moved so as to be positioned on the multi lens 42 side. On the other hand, change in the individual focal length as to each wavelength, of the collimator lens 37 and multi lens 42 is small. These mean that focal lengths $S_{cm2}$ and $S_{cm3}$ as to the second-wavelength and third-wavelength optical beams are smaller than a focal length $S_{cm1}$ as to the first-wavelength optical beam. This is because in the case of the second and third wavelengths as to the first wavelength, the value of d with the denominator of Expression (5) is small, i.e., the denominator of Expression (5) gets greater, and the focal length of the virtual complex lens 49 of these obtained with f' in Expression (5) gets smaller. Subsequently, this means that, with the focal length as to each wavelength, the following expression $S_{cm1}>S_{cm2}$, and $S_{cm1}>S_{cm3}$ are satisfied.

Subsequently, according to each relational expression of focal lengths $S_{o1}$, $S_{o2}$, $S_{o3}$, $S_{cm1}$, $S_{cm2}$, and $S_{cm3}$ as to each wavelength, with the above-described the relational expression of $M=S_{cm}/S_o$, the denominators $S_{o2}$ and $S_{o3}$ are smaller than the denominator $S_{o1}$, and the numerators $S_{cm2}$ and $S_{cm3}$ are smaller than the numerator $S_{cm1}$, and consequently, the return magnifications $M_2$ and $M_3$ corresponding to the second and third wavelengths are smaller than the return magnification $M_1$ corresponding to the first wavelength, i.e., the following relational expression $M_1>M_2$ and relational expression $M_1>M_3$ are satisfied. Consequently, according to such return magnification relations, with regard to the focus capture range $S_{ji} (=\Delta/2M_2)$, the focus capture range in the case of employing the first wavelength is set smaller than the focus capture range in the case of employing the second and third wavelengths.

Also, as described above, the incident magnifications $m_2$ and $m_3$ as to the condensing optical device 36 are set to a predetermined magnification, i.e., are set so as to satisfy Expressions (2) and (3), thereby enabling the return magnifications $M_2$ and $M_3$ corresponding to the second and third wavelengths to be set as appropriate as to the return magnification $M_1$ corresponding to the first wavelength, and according to an arrangement wherein the light receiving unit 40 which is a light receiving unit is common, and with a return common optical system between the light receiving unit 40 and objective lens 34, the collimator lens 37 is disposed in a different position according to each wavelength, and the objective lens 34 corresponding thereto is provided, each of the focus capture ranges can be set to an appropriate value according to a format. Thus, the focus capture ranges are set to appropriate values, thereby preventing the sensitivity of focus servo from deterioration, preventing appropriate focus servo from inhibition due to occurrence of defocusing, and accordingly, excellent recording and playback properties can be realized.

Figure 7A:
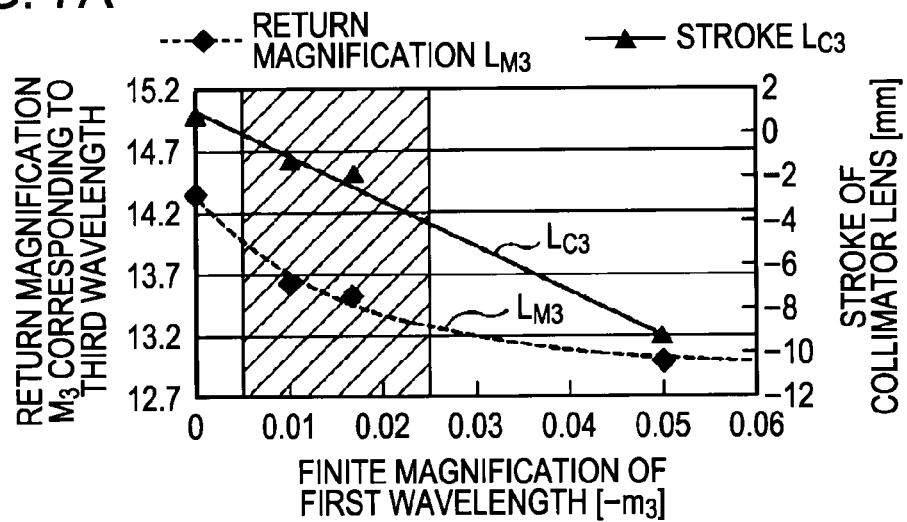
Figure 7B:
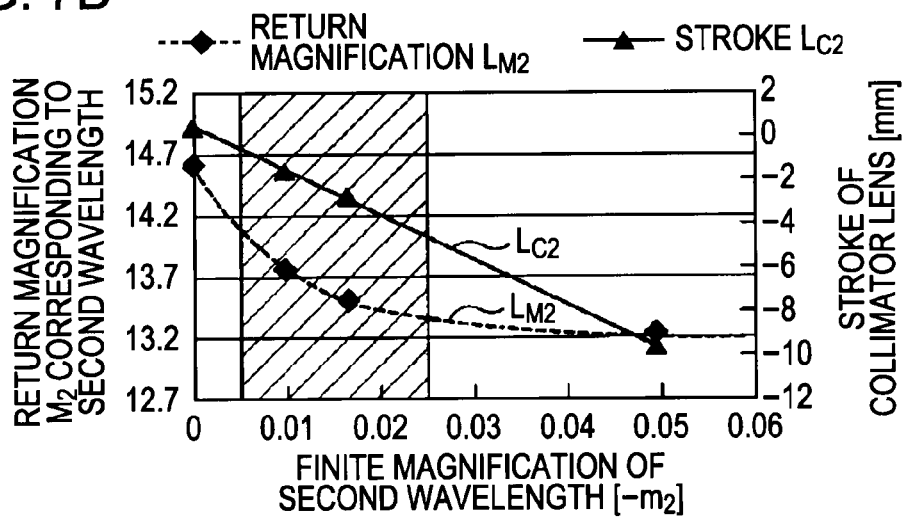
Figure 7C:
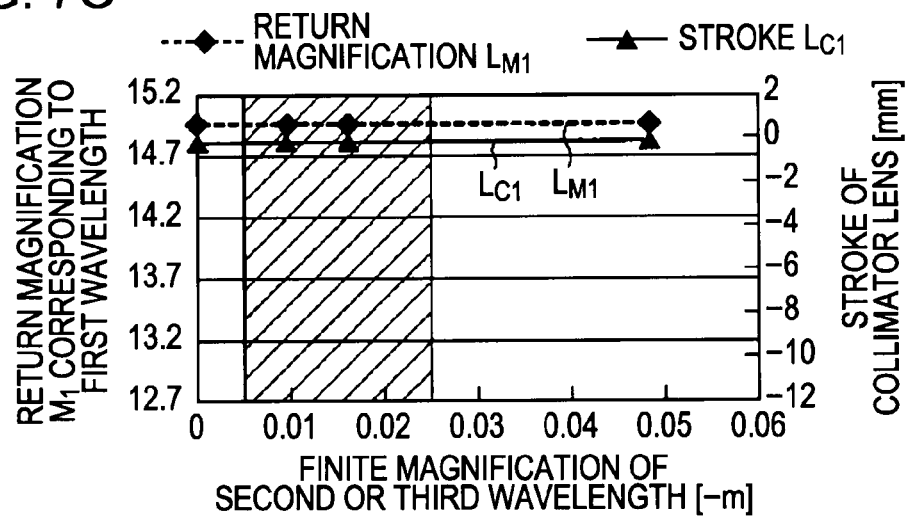

Now, with an example wherein the return magnification corresponding to the first wavelength of the common return optical system is fixed to 15 times, and each of the optical components is disposed, the relation of change in the return magnifications $M_2$ and $M_3$ in the case of changing the incident finite magnifications $m_2$ and $m_3$ of the second-wavelength and third-wavelength optical beams as to the condensing optical device 36 is shown in FIGS. 7A through 7C. Also, Tables 1 through 4 indicate relations of "focal length of objective lens" as to each wavelength, "incident magnification m" of each wavelength as to the condensing optical device 36, "outgoing magnification" as to each wavelength, "return magnification M" as to each wavelength, "stroke amount" of the collimator lens 37 in the case of employing the second and third wavelengths with the position in the case of employing the first wavelength as reference, a so-called "sigmoid p-p" indicating the focus capture range of each wavelength, in a case wherein the incident magnifications $m_2$ and $m_3$ of the second-wavelength and third-wavelength optical beams as to the condensing optical device 36 are changed to "$-1/20$", "$-1/60$", "$-1/100$", and "$1/\infty$", and the optimal objective lens 34 and diffraction optical device 35 are formed.

TABLE 1

INCIDENT MAGNIFICATIONS $m_2$ and $m_3 = -1/20$

| | THIRD WAVE-LENGTH | SECOND WAVE-LENGTH | FIRST WAVE-LENGTH |
|---|---|---|---|
| FOCAL LENGTH OF OBJECTIVE LENS | 2.34 | 2.30 | 2.20 |
| INCIDENT MAGNIFICATION | −1/20 | −1/20 | 0 |
| OUTGOING MAGNIFICATION | 8.87 | 8.95 | 10.00 |
| RETURN MAGNIFICATION M | 13.00 | 13.27 | 15.00 |
| STROKE AMOUNT | −9.20 | −9.50 | 0.00 |
| SIGMOID p-p | 4.53 | 4.29 | 3.00 |

TABLE 2

INCIDENT MAGNIFICATIONS $m_2$ and $m_3 = -1/60$

| | THIRD WAVE-LENGTH | SECOND WAVE-LENGTH | FIRST WAVE-LENGTH |
|---|---|---|---|
| FOCAL LENGTH OF OBJECTIVE LENS | 2.35 | 2.30 | 2.20 |
| INCIDENT MAGNIFICATION | −1/60 | −1/60 | 0 |
| OUTGOING MAGNIFICATION | 9.13 | 9.13 | 10.00 |
| RETURN MAGNIFICATION M | 13.53 | 13.55 | 15.00 |
| STROKE AMOUNT | −1.84 | −2.70 | 0.00 |
| SIGMOID p-p | 4.18 | 4.11 | 3.00 |

TABLE 3

INCIDENT MAGNIFICATIONS $m_2$ and $m_3 = -1/100$

| | THIRD WAVE-LENGTH | SECOND WAVE-LENGTH | FIRST WAVE-LENGTH |
|---|---|---|---|
| FOCAL LENGTH OF OBJECTIVE LENS | 2.34 | 2.30 | 2.20 |
| INCIDENT MAGNIFICATION | −1/100 | −1/100 | 0 |
| OUTGOING MAGNIFICATION | 9.29 | 9.39 | 10.00 |
| RETURN MAGNIFICATION M | 13.65 | 13.82 | 15.00 |
| STROKE AMOUNT | −1.20 | −1.43 | 0.00 |
| SIGMOID p-p | 4.11 | 3.96 | 3.00 |

TABLE 4

INCIDENT MAGNIFICATIONS $m_2$ and $m_3 = 1/\infty$

| | THIRD WAVE-LENGTH | SECOND WAVE-LENGTH | FIRST WAVE-LENGTH |
|---|---|---|---|
| FOCAL LENGTH OF OBJECTIVE LENS | 2.36 | 2.31 | 2.20 |
| INCIDENT MAGNIFICATION | 0 | 0 | 0 |
| OUTGOING | 9.73 | 9.88 | 10.00 |

TABLE 4-continued

INCIDENT MAGNIFICATIONS $m_2$ and $m_3 = 1/\infty$

|  | THIRD WAVE-LENGTH | SECOND WAVE-LENGTH | FIRST WAVE-LENGTH |
|---|---|---|---|
| MAGNIFICATION RETURN MAGNIFICATION M | 14.37 | 14.62 | 15.00 |
| STROKE AMOUNT | 0.83 | 0.69 | 0.00 |
| SIGMOID p-p | 3.71 | 3.54 | 3.00 |

Also, FIG. 7A shows a dashed line $L_{M3}$ indicating change in the return magnification $M_3$ as to the third-wavelength optical beam accompanied with change in the incident magnification as to the condensing optical device 36 of the third-wavelength optical beam as to the third optical disc (CD or the like), and a solid line $L_{C3}$ indicating change in the stroke amount (movement amount) of the collimator lens 37. Here, with the position of the collimator lens 37 at the time of the first wavelength as reference, the stroke amount indicates the movement amount to the position of the collimator lens 37 at the time of the relevant third wavelength as to the reference position. The horizontal axis in FIG. 7A indicates the value of $(-m_3)$ when assuming that the incident magnification of the third-wavelength optical beam is $m_3$, the vertical axis as to the dashed line $L_{M3}$ indicates the return magnification $M_3$ as to the third-wavelength optical beam, and the vertical axis as to the solid line $L_{C3}$ indicates the stroke amount (mm) of the collimator lens 37.

Also, FIG. 7B shows a dashed line $L_{M2}$ indicating change in the return magnification $M_2$ as to the second-wavelength optical beam accompanied with change in the incident magnification as to the condensing optical device 36 of the second-wavelength optical beam as to the second optical disc (DVD or the like), and a solid line $L_{C2}$ indicating change in the movement amount of the collimator lens 37. The horizontal axis in FIG. 7B indicates the value of $(-m_2)$ when assuming that the incident magnification of the second-wavelength optical beam is $m_2$, the vertical axis as to the dashed line $L_{M2}$ indicates the return magnification $M_2$ as to the second-wavelength optical beam, and the vertical axis as to the solid line $L_{C2}$ indicates the movement amount (mm) of the collimator lens 37.

Also, FIG. 7C shows a dashed line $L_{M1}$ indicating change in the return magnification $M_1$ as to the first-wavelength optical beam by comparing change in the incident magnification as to the condensing optical device 36 of the second-wavelength and third-wavelength optical beams as to the second and third optical discs, and a solid line $L_{C1}$ indicating change in the movement amount of the collimator lens 37 as to the first wavelength. The horizontal axis in FIG. 7C indicates the value of $(-m)$ when assuming that one of the incident magnifications $m_2$ and $m_3$ of the second-wavelength and third-wavelength optical beams is m, the vertical axis as to the dashed line $L_{M1}$ indicates the return magnification $M_1$ as to the first-wavelength optical beam, and the vertical axis as to the solid line $L_{C1}$ indicates the movement amount (mm) of the collimator lens 37. Here, the reason why the horizontal axis is taken as one of the second-wavelength and third-wavelength optical beams is to indicate the return magnification $M_1$ to be compared with the second and third return magnifications $M_2$ and $M_3$ (FIGS. 7A and 7B) as to change in the finite magnifications of the second and third wavelengths since the first-wavelength optical beam is an infinite system which is parallel light. Note that ranges subjected to hatching in FIGS. 7A and 7B indicate ranges suitable from the perspective of the return magnification and stroke amount as described later, and specifically indicate a range of 0.005 through 0.025 in the horizontal axis.

As shown in FIGS. 7A and 7B, the return magnifications $M_2$ and $M_3$ can be set to a sufficiently smaller value as compared to the return magnification $M_1$ shown in FIG. 7C wherein the incident magnifications $m_2$ and $m_3$ of the second and third wavelengths as to the condensing optical device 36 are in a range of $m_2$ and $m_3 \leq -1/200 (0.005 \leq (-m_2)$ and $(-m_3))$, whereby the focus capture range can be set to an appropriate value. Note that respective optical disc formats is stipulated with the above-described written standards, and with the optical pickup 3 employing the movable collimator lens 37, and the objective lens 34 which is an infinite system as to the first wavelength, and is a finite system as to the second and third wavelengths, a desired focus capture range can be obtained with suitable return magnification relations between the $M_1$ and $M_2$, and between the $M_1$ and $M_3$ within the above-described range.

On the other hand, as shown in FIGS. 7A and 7B, setting the incident finite magnifications $(-m_2)$ and $(-m_3)$ to a greater value excels in from the perspective of having a return magnification difference between the return magnification $M_1$, and the return magnifications $M_2$ and $M_3$, but leads to a problem such as increase in the stroke amount for driving the collimator lens 37. This increase in the stroke amount causes a serious problem such as increase in size of the actuator for the collimator lens 37, increase in size of the optical system, or the like. From the perspective of the stroke amount of the collimator lens 37, the stroke amount of the collimator lens 37 can be set to a suitable range wherein the incident magnifications $m_2$ and $m_3$ of the second and third wavelengths as to the condensing optical device 36 are in a range of $-1/40 \leq m_2$ and $m_3$ $((-m_2)$ and $(-m_3) \leq 0.025)$, whereby occurrence of a problem relating to the configuration of the optical pickup 3, and a problem of increase in size of the device, or the like, can be prevented.

Also, of the above-mentioned ranges of $-1/40 \leq m_2$ and $m_3 \leq -1/200$, in the case of $m_2$ and $m_3 = -1/60$ and $m_2$ and $m_3 = -1/100$ shown in Tables 2 and 3, in particular, while the return magnification $M_1$ of the first wavelength is 15.00, the return magnification $M_2$ of the second wavelength is 13.55, 13.82, and the return magnification $M_3$ of the third wavelength is 13.53, 13.65, i.e., a desired focus capture range can be set by providing a sufficient magnification difference to the return magnifications $M_2$ and $M_3$ as to the second and third wavelengths as compared to the return magnification $M_1$ as to the first wavelength, and also the stroke amount of the collimator lens 37 is $-2.70$, $-1.43$ in the case of the second wavelength, and is $-1.84$, $-1.20$ in the case of the third wavelength, and accordingly, can be suppressed to a sufficiently small value having no problem from the perspective of the configuration of the device, and in other words, the range of $-1/60 \leq m_2$ and $m_3 \leq -1/100$ does not lead a problem such as increase in size of the device or the like, and can improve the focus capture range.

As described above, the collimator lens 37 and collimator lens driving unit 47 can adjust the divergence angle of the corresponding wavelength optical beam according to the type of the mounted optical disc, and can emit the optical beam thereof toward the condensing optical device 36 side as parallel light or diffusion light in a state wherein the optical beam inputs to the condensing optical device 36 with desired incident magnifications $m_1$, $m_2$, and $m_3$. Note that the collimator lens 37 and collimator lens driving unit 47 can set the incident magnification as to the condensing optical device 36 to a suitable range for each wavelength by adjusting the divergence angle of the passed optical beam, and also in a case wherein the mounted disc is a so-called multilayer optical disc having multiple signal recording faces, enables recording and/or playback as to any of the signal recording faces to be performed.

The ¼ wavelength plate 45 adds a ¼-wavelength phase to the outgoing first-wavelength through third-wavelength optical beams of which the divergence angles have been transformed by the collimator lens 37, thereby emitting the optical beams to the redirecting mirror 46 side in a circular polarized state changed from a linear polarized state, and adds a ¼-wavelength phase to the return first-wavelength through third-wavelength optical beams, thereby emitting the optical beams to the collimator lens 37 side in a linear polarized state changed from a circular polarized state.

The redirecting mirror 46 reflects the optical beams to which a ¼-wavelength phase difference has been added by the ¼ wavelength plate 45, and emits the optical beams to the diffraction optical device 35 side in a state matching the optical axis thereof with the optical axis of the objective lens 34.

The objective lens 34 condenses the input first-wavelength through third-wavelength optical beams on the signal recording face of the optical disc 2. The objective lens 34 is held by an objective lens driving mechanism such as an unshown biaxial actuator or the like in a movable manner. The objective lens 34 is moved and operated by the biaxial actuator or the like based on the tracking error signal and focus error signal generated with the return light from the optical disc 2 detected by the detector 41, thereby being moved in the biaxial directions of a direction approaching and retreating from the optical disc 2, and the diameter direction of the optical disc 2. The objective lens 34 focuses the optical beams from the first through third emission units such that the optical beams thereof are constantly in focus on the signal recording face of the optical disc 2, and causes the focused optical beams to follow a recording track formed on the signal recording face of the optical disc 2. Note that an arrangement is made wherein the later-described diffraction optical device 35 is held in a lens holder of the objective lens driving mechanism in which the objective lens is held so as to be integral with the objective lens 34, and later-described operation effects of a diffraction unit 50 provided in the diffraction optical device 35 can also be exhibited appropriately at the time of field shift such as movement toward the tracking direction of the objective lens 34, or the like.

A diffraction unit 50 made up of multiple diffraction areas is provided on one of the faces of the diffraction optical device 35, e.g., on the incident side face, each of the first-wavelength through third-wavelength optical beams passing through for each of the multiple diffraction areas is diffracted by this diffraction unit 50 so as to obtain a predetermined order, and is input to the objective lens 34, i.e., input to the objective lens 34 as an optical beam in a diffusion state or convergent state having a predetermined divergence angle, thereby enabling each of the first-wavelength through third-wavelength optical beams to be condensed appropriately by employing the single objective lens 34 so as not to generate spherical aberration as to the signal recording faces of three types of optical discs corresponding to each of the first-wavelength through third-wavelength optical beams.

Figure 8:
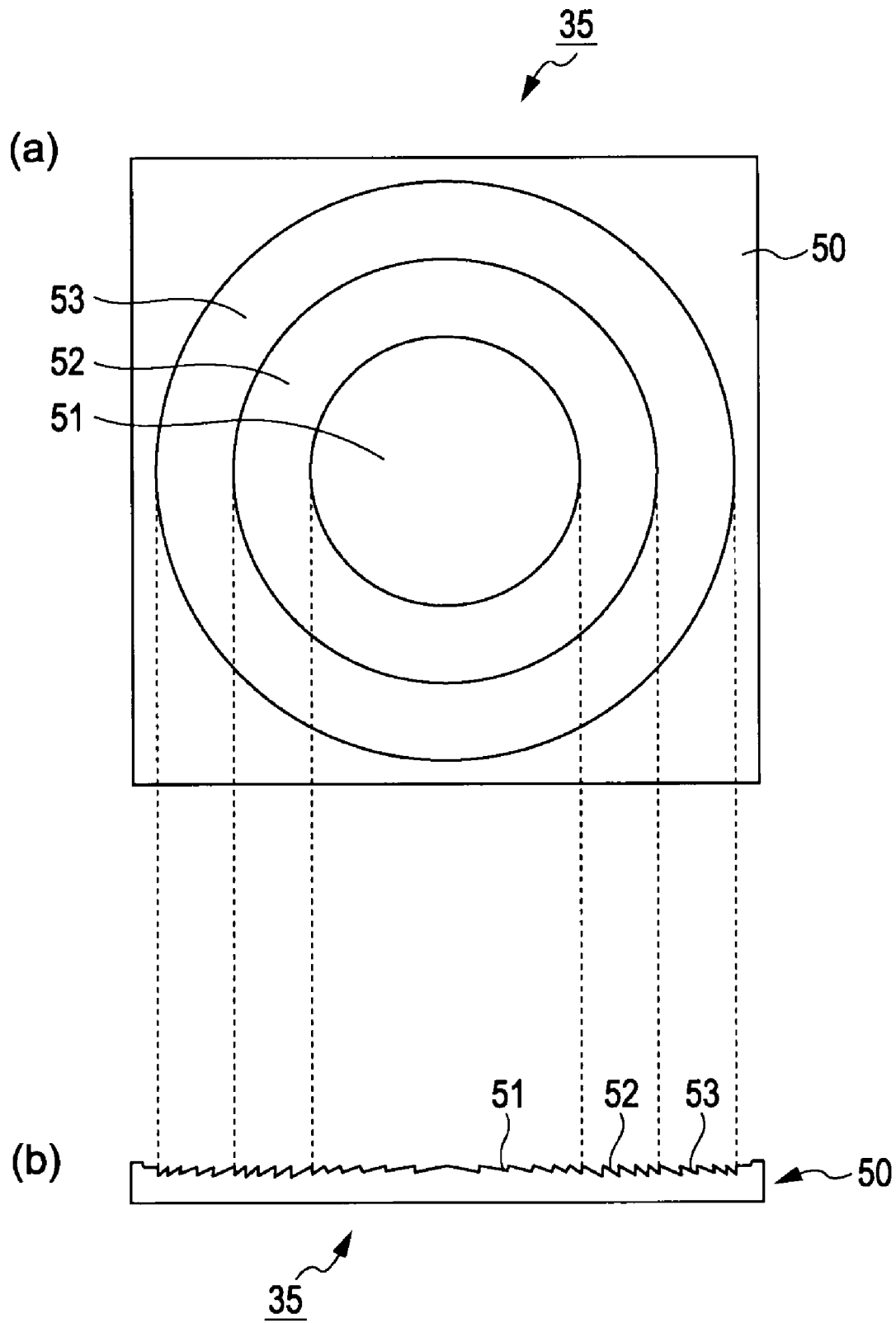
FIG. 8 is a diagram for describing an example of a diffraction optical device making up the optical pickup to which an embodiment of the present invention has been applied, wherein (a) is a plan view of the diffraction optical device, and (b) is a cross-sectional view of the diffraction optical device.

Specifically, as shown in (a) and (b) in FIG. 8, the diffraction unit 50 provided on the incident side face of the diffraction optical device 35 includes a first diffraction area (hereafter, also referred to as "inner circular zone") 51 having an approximate circular shape provided on the innermost circumferential portion, a second diffraction area (hereafter, also referred to as "middle circular zone") 52 having a circular zone shape provided on the outside of the first diffraction area 51, and a third diffraction area (hereafter, also referred to as "outer circular zone") 53 having a circular zone shape provided on the outside of the first diffraction area 52.

With the first diffraction area 51 which is an inner circular zone, a first diffraction configuration having a circular zone shape and a predetermined depth is formed, which generates the diffraction light of an order for condensing the passing first-wavelength optical beam so as to be dominant so as to form an appropriate spot on the signal recording face of the first optical disc through the objective lens 34, i.e., generates this diffraction light so as to exhibit the maximum diffraction efficiency as compared to the diffraction light of other orders.

Also, the first diffraction area 51 generates the diffraction light of an order for condensing the passing second-wavelength optical beam by the first diffraction configuration so as to be dominant so as to form an appropriate spot on the signal recording face of the second optical disc through the objective lens 34, i.e., generates this diffraction light so as to exhibit the maximum diffraction efficiency as compared to the diffraction light of other orders.

Also, the first diffraction area 51 generates the diffraction light of an order for condensing the passing third-wavelength optical beam by the first diffraction configuration so as to be dominant so as to form an appropriate spot on the signal recording face of the third optical disc through the objective lens 34, i.e., generates this diffraction light so as to exhibit the maximum diffraction efficiency as compared to the diffraction light of other orders.

Thus, with the first diffraction area 51, the diffraction configuration is formed so as to be suitable for the diffraction light of the above-mentioned predetermined order being dominant as to the above-mentioned each wavelength optical beam, thereby enabling spherical aberration to be corrected and reduced when each wavelength optical beam passed through the first diffraction area 51 and converted into the diffraction light of a predetermined order is condensed on the signal recording face of each of the optical disc by the objective lens 34.

With the second diffraction area 52 which is a middle circular zone, a second diffraction configuration having a circular zone shape and a predetermined depth and a different configuration from the first diffraction configuration is formed, which generates the diffraction light of an order for condensing the passing first-wavelength optical beam so as to be dominant so as to form an appropriate spot on the signal recording face of the first optical disc through the objective lens 34, i.e., generates this diffraction light so as to exhibit the maximum diffraction efficiency as compared to the diffraction light of other orders.

Also, the second diffraction area 52 generates the diffraction light of an order for condensing the passing second-wavelength optical beam by the second diffraction configuration so as to be dominant so as to form an appropriate spot on the signal recording face of the second optical disc through the objective lens 34, i.e., generates this diffraction light so as to exhibit the maximum diffraction efficiency as compared to the diffraction light of other orders. Note that the second diffraction area 52 can sufficiently reduce the diffraction efficiency of the diffraction light of an order for condensing the passing third-wavelength optical beam so as to form an appropriate spot on the signal recording face of the third optical disc through the objective lens 34.

Also, the second diffraction area 52 generates the diffraction light of an order for condensing the passing third-wavelength optical beam by the second diffraction configuration so as to be dominant so as to form an appropriate spot on the signal recording face of the third optical disc through the objective lens 34, i.e., generates this diffraction light so as to exhibit the maximum diffraction efficiency as compared to the diffraction light of other orders. Note that the second diffraction area 52 can sufficiently reduce the diffraction efficiency of the diffraction light of an order for condensing the passing third-wavelength optical beam so as to form an appropriate spot on the signal recording face of the third optical disc through the objective lens 34.

Thus, with the second diffraction area 52, the diffraction configuration is formed so as to be suitable for the diffraction light of the above-mentioned predetermined order being dominant as to the above-mentioned each wavelength optical beam, thereby enabling spherical aberration to be corrected and reduced when the first-wavelength and second-wavelength optical beams passed through the second diffraction area 52 and converted into the diffraction light of a predetermined order is condensed on the signal recording face of each of the optical disc by the objective lens 34.

With the third diffraction area 53 which is an outer circular zone, a third diffraction configuration having a circular zone shape and a predetermined depth and a different configuration from the first and second diffraction configurations is formed, which generates the diffraction light of an order for condensing the passing first-wavelength optical beam so as to be dominant so as to form an appropriate spot on the signal recording face of the first optical disc through the objective lens 34, i.e., generates this diffraction light so as to exhibit the maximum diffraction efficiency as compared to the diffraction light of other orders.

Also, the third diffraction area 53 generates the diffraction light of an order for condensing the passing second-wavelength optical beam by the third diffraction configuration so as to be dominant so as to form an appropriate spot on the signal recording face of the second optical disc through the objective lens 34, i.e., generates this diffraction light so as to exhibit the maximum diffraction efficiency as compared to the diffraction light of other orders. Note that the third diffraction area 53 can sufficiently reduce the diffraction efficiency of the diffraction light of an order for condensing the passing second-wavelength optical beam so as to form an appropriate spot on the signal recording face of the second optical disc through the objective lens 34.

Also, the third diffraction area 53 generates the diffraction light of an order for condensing the passing third-wavelength optical beam by the third diffraction configuration so as to be dominant so as to form an appropriate spot on the signal recording face of the third optical disc through the objective lens 34, i.e., generates this diffraction light so as to exhibit the maximum diffraction efficiency as compared to the diffraction light of other orders. Note that the third diffraction area 53 can sufficiently reduce the diffraction efficiency of the diffraction light of an order for condensing the passing third-wavelength optical beam so as to form an appropriate spot on the signal recording face of the third optical disc through the objective lens 34.

Thus, with the third diffraction area 53, the diffraction configuration is formed so as to be suitable for the diffraction light of the above-mentioned predetermined order being dominant as to the above-mentioned each wavelength optical beam, thereby enabling spherical aberration to be corrected and reduced when the first-wavelength optical beam passed through the third diffraction area 53 and converted into the diffraction light of a predetermined order is condensed on the signal recording face of each of the optical disc by the objective lens 34.

The above-mentioned first through third diffraction areas 51, 52, and 53, for example, are circular zone shapes with the optical axis as the center, and the cross-sectional shape thereof is formed so as to be a blaze shape or step shape having a predetermined depth. With the diffraction configuration of each of the diffraction areas 51, 52, and 53, the groove depth and groove width are formed such that the diffraction angle of the diffraction light of a predetermined order, and the diffraction efficiency of the diffraction light of this order become a predetermined range whereby a spot condensed on the signal recording face of each of the optical discs becomes optimal.

Also, the first through third diffraction areas 51, 52, and 53 function so as to perform aperture control as to each wavelength optical beam which passes through. That is to say, the first diffraction area 51 is formed, for example, in a size corresponding to NA=0.45 or so, the second diffraction area 52 is formed, for example, in a size corresponding to NA=0.6 or so, and the third diffraction area 53 is formed, for example, in a size corresponding to NA=0.85 or so. The first through third diffraction areas 51, 52, and 53 enables aperture control to be performed so as to obtain, for example, NA of 0.85 or so regarding the passing first-wavelength optical beam, enables aperture control to be performed so as to obtain, for example, NA of 0.60 or so regarding the passing second-wavelength optical beam, and enables aperture control to be performed so as to obtain, for example, NA of 0.45 or so regarding the passing third-wavelength optical beam. Thus, the diffraction unit 50 made up of the first through third diffraction areas 51, 52, and 53 can perform aperture control with numeric aperture corresponding to three types of optical discs and three types of wavelength optical beams, thereby eliminating an aperture control filter used for an optical pickup according to the related art, and adjustment at the time of disposing this, and enabling simplification of the configuration of the optical pickup, reduction in size, and reduction in cost.

Figure 9A:
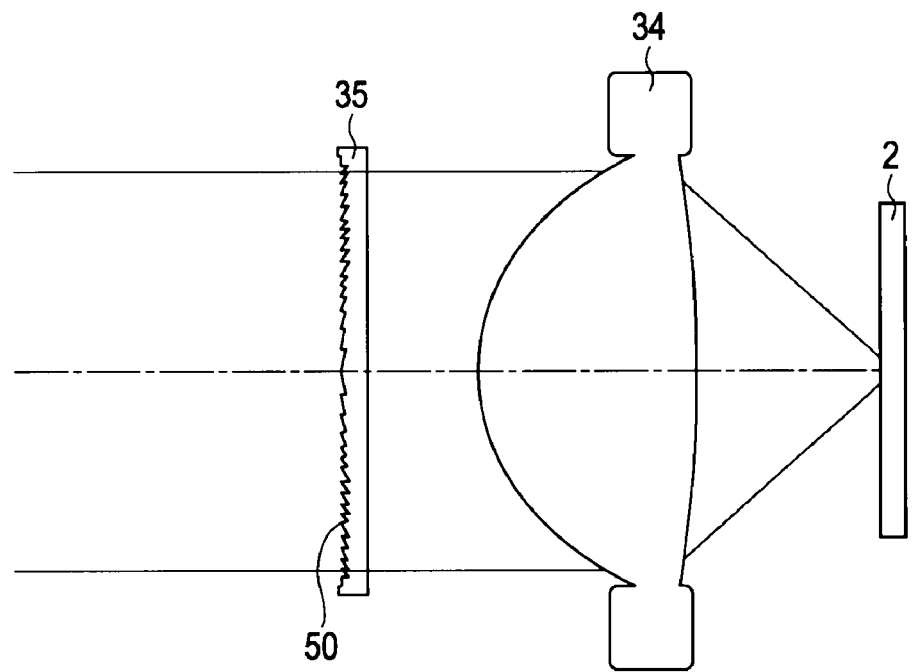
Figure 9B:
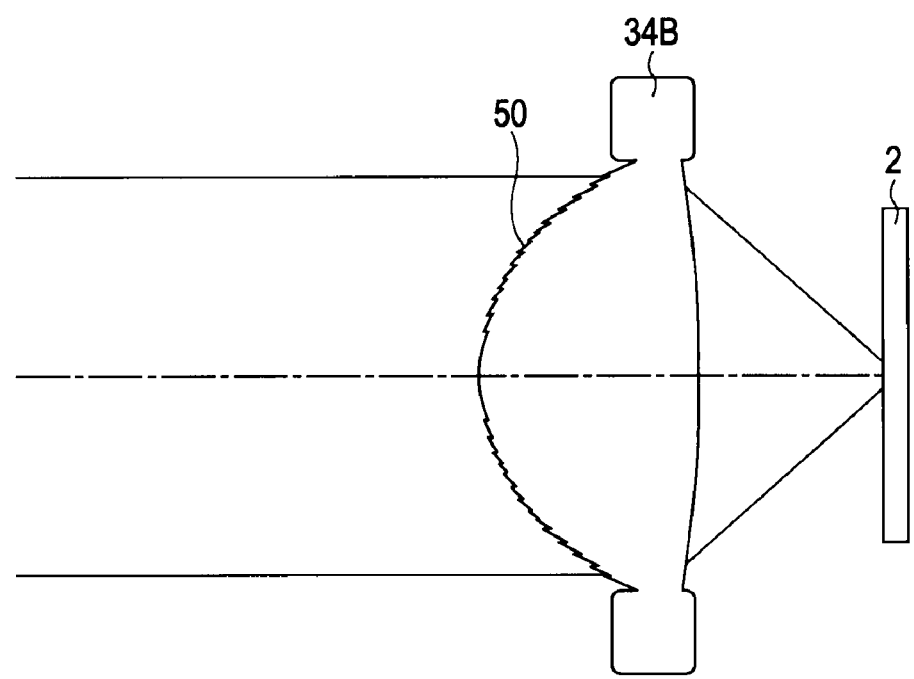

Also, with the above description, as shown in FIG. 9A, an arrangement has been made wherein the diffraction unit 50 made up of the three diffraction areas 51, 52, and 53 is provided on the incident side face of the diffraction optical device 35 provided separately from the objective lens 34, but the present invention is not restricted to this, the diffraction unit 50 may be provided on the emission side of the diffraction optical device 35. Further, an arrangement may be made wherein the diffraction unit 50 including the first through third diffraction areas 51, 52, and 53 is provided integral with the incident side or emission side of the objective lens 34, and for example, as shown in FIG. 9B, an arrangement may be made wherein an objective lens 34B including the diffraction unit 50 on the incident side thereof is provided. For example, in a case wherein the diffraction unit 50 is provided on the incident side face of the objective lens 34B, with the face shape of the incident side face used as the functions of an objective lens as reference, the face shape, such as a combination of the reference and the face shape of the above-mentioned diffraction configuration, is formed. The objective lens 34B thus configured serves as a condensing optical device for appropriately condensing three different wavelength optical beams on the signal recording face of the corresponding optical disc by this one device alone, while the above-mentioned diffraction optical device 35 and objective lens 34 serve as the condensing optical device 36 by the two devices. The diffraction unit 50 is provided integral with the objective lens 34B, and this is employed for the condensing optical device making up the optical pickup to which an embodiment of the present invention has been applied, thereby enabling reduction in optical components, and reduction in size of the configuration. The objective lens 34B wherein a diffraction unit having the same function as the diffraction unit 50 is provided on the incident side or emission side is employed as the optical pickup, thereby reducing aberration and so forth, realizing three-wavelength compatibility of the optical pickup, reducing the number of components, enabling simplification of the configuration and reduction in size, and realizing high productivity and reduction in cost.

As described above, the condensing optical device 36 made up of the objective lens 34 and diffraction optical device 35, and the condensing optical device made up of the objective lens 34B are configured so as to condense the first-wavelength optical beam of which the divergence angle has converted by the collimator lens 37 to obtain approximate parallel light on the signal recording face of the first optical disc appropriately, condense the second-wavelength optical beam of which the divergence angle has converted by the collimator lens 37 to obtain diffusion light with a predetermined divergence angle on the signal recording face of the second optical disc appropriately, and condense the third-wavelength optical beam of which the divergence angle has converted by the collimator lens 37 to obtain diffusion light with a predetermined divergence angle on the signal recording face of the third optical disc appropriately. That is to say, the condensing optical device 36 or the like condenses each wavelength optical beam of which the incident magnifications are set to the $m_1$, $m_2$, and $m_3$ or so on the signal recording face of the corresponding optical disc appropriately.

The multi lens 42 is disposed on the optical path between the first beam splitter 38 and light receiving unit 40, adds a predetermined magnification and refractive power to the first-wavelength through third-wavelength optical beams, which are returned, reflected at the signal recording face of each optical disc, passed through the objective lens 34, diffraction optical device 35, redirecting mirror 46, ¼ wavelength plate 45, and collimator lens 37, transmitted to the second and first beam splitters 39 and 38, and separated from the outgoing optical beams, with the optical beams being condensed on the light receiving unit of the light receiving unit 40 such as the photodetector of the detector 41, or the like, appropriately. At this time, the multi lens 42 adds astigmatism for detecting a focus error signal or the like to the return optical beams. Thus, the multi lens 42 serves as a device for adding astigmatism, and adding refractive power for condensing return each wavelength optical beam which has input on the common light receiving unit 40.

The multi lens 42 may be configured of, for example, S-BSL 7 (vd=64.1) or the like similar to the above-mentioned collimator lens 37, or may be configured of a material of which the material dispersion is greater than that of the collimator lens 37, e.g., may be configured of low Tg optical glass or the like such as S-NPH2 (vd=18.9) (OHARA Inc.) of which the Abbe's number is small, and the material dispersion is great. The multi lens 42 is configured of a material of which the material dispersion is greater than that of the collimator lens 37, thereby providing a function for adding a magnification difference to the return magnification depending on the case of the first wavelength, and the case of the second and third wavelengths, i.e., contributes to reduction of the return magnifications $M_2$ and $M_3$ corresponding to the second and third wavelengths as compared to the return magnification $M_1$ corresponding to the first wavelength, thereby contributing to increase in the focus capture ranges corresponding to second and third wavelengths as compared to the focus capture range corresponding to the first wavelength, and enabling each of the focus capture ranges to be set to a more suitable value according to formats by combining an arrangement wherein the incident magnifications $m_1$, $m_2$, and $m_3$ as to the condensing optical device 36 are set to a suitable range.

Now, if we say that the Abbe's number of a material is $v$, the material dispersion is represented with $1/v$. Subsequently, if we say that the Abbe's number of the constituent material of the multi lens 42 is vml, and the Abbe's number of the constituent material of the collimator lens 37 is vcl, that the material dispersion (1/vml) of the multi lens 42 is greater than the material dispersion (1/vcl) of the collimator lens 37 means $(1/vcl) \leq (1/vml)$, and upon this being transformed, means $(vml/vcl) \leq 1$.

Description will be made regarding a case wherein a lens material or the like having high-dispersion properties is selected as the material of the multi lens 42, which is disposed on the return optical system, for condensing return light on the light receiving face of the light receiving unit 40, whereby the return magnifications $M_2$ and $M_3$ corresponding to the second and third wavelengths which are longer than the first wavelength can be set smaller than the return magnification $M_1$ corresponding to the first wavelength. With this arrangement and function, a refractive index depends on a wavelength, and with the material making up the collimator lens 37 or multi lens 42, properties that, in general, as a wavelength is shortened, the refractive index of the wavelength gets greater are employed. Note that, in order to have such a function by employing a material of which the material dispersion is great as the material of the multi lens 42, it is desirable to configure the multi lens 42 as a lens having negative refractive power.

Figure 10A:
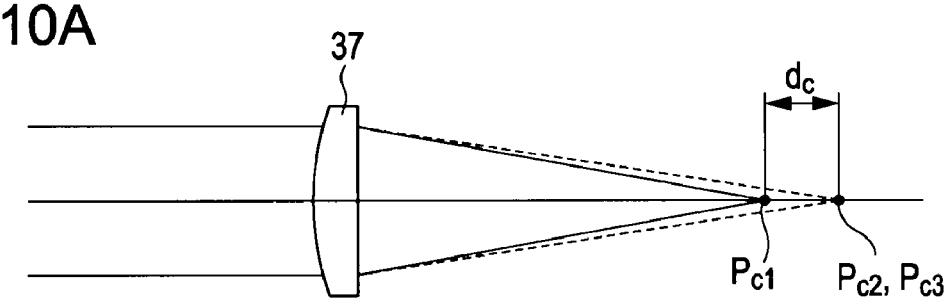

The collimator lens 37 is a lens having positive refractive power. For example, as shown in FIG. 10A, in a case wherein the first-wavelength through third-wavelength optical beams are input to the collimator lens 37 in the same state (parallel state), condensed positions $P_{c2}$ and $P_{c3}$ of the second-wavelength and third-wavelength optical beams which are longer than the first wavelength are positioned on the advancing direction side, i.e., the back side, as compared to a condensed position $P_{c1}$ of the first-wavelength optical beam. The smaller the material dispersion (1/v) is, the smaller the interval dc of the condensed positions is. Note that, in reality, the focal length corresponding to each wavelength of the condensing optical device 36 made up of the objective lens 34 and diffraction optical device 35, and the position of the collimator lens 37 differ, so each wavelength optical beam is not necessarily input to the collimator lens 37 in the same state, but FIG. 10A is a conceptual diagram illustrating only the difference between the condensed positions of the respective wavelengths according to the material dispersion of the collimator lens 37. Also, FIG. 10A and later-described FIG. 10B are diagrams wherein the condensed positions $P_{c2}$, $P_{c3}$, $P_{m2}$, and $P_{m3}$ of the second-wavelength and third-wavelength optical beams are condensed on the same position, and strictly condensed on minutely different positions, but these diagrams are diagrams for illustrating a function for providing a difference between the first-wavelength optical beam and the second-wavelength and third-wavelength optical beams, wherein the optical beams are condensed on the same position for the sake of simplification of description, and clearness of the diagrams.

Figure 10B:
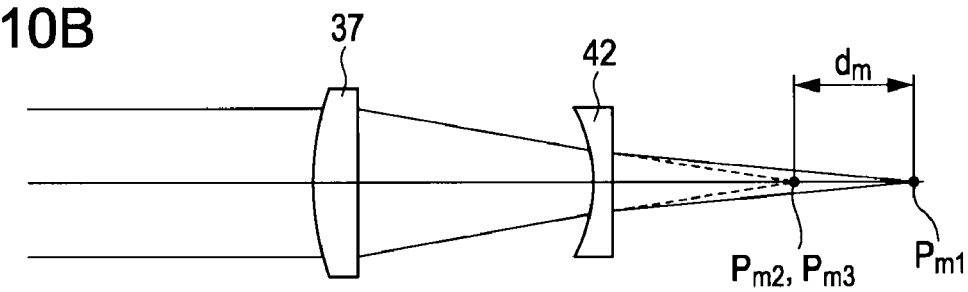

On the other hand, in a case wherein the multi lens 42 is a lens having negative refractive power, for example, as shown in FIG. 10B, in a case wherein the first-wavelength through third-wavelength optical beams are input in the same state (convergent state), the condensed positions $P_{m2}$ and $P_{m3}$ of the second-wavelength and third-wavelength optical beams are located on the opposite side of the advancing direction, i.e., the front side, as compared to the condensed position $P_{m1}$ of the first-wavelength optical beam. The greater the material dispersion is, the greater the interval dm of the condensed positions is. Note that, in reality, the first-wavelength optical beam, and the second-wavelength and third-wavelength optical beams are not necessarily input to the multi lens 42 in the same state according to the above-mentioned material dispersion of the collimator lens 37, but FIG. 10B is a conceptual diagram for illustrating only the difference between the condensed positions of the respective wavelengths according to the material dispersion of the multi lens 42.

Figure 10C:
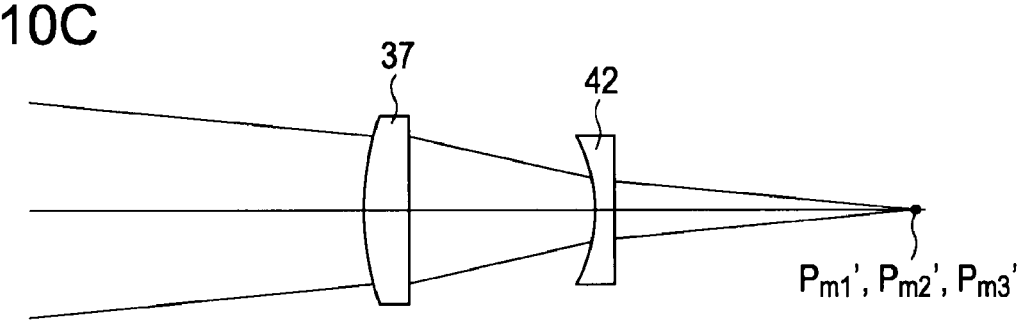

As described above, when assuming a case wherein the material dispersion of the multi lens 42 is set greater than the material dispersion of the collimator lens 37, whereby the respective wavelengths optical beams are input in the same state, the condensed position of the second-wavelength and third-wavelength optical beams can be located on the front side as compared to the condensed position of the first-wavelength optical beam. This means that when calculating the above-mentioned return magnification M ($M=S_{cm}/S_o$), the focal lengths $S_{cm2}$ and $S_{cm3}$ of the second and third wavelengths are set smaller than the focal length $S_{cm1}$ of the first wavelength, which leads an advantage wherein the return magnification $M_2$ and $M_3$ of the second and third wavelengths are suppressed to small as compared to the return magnification $M_1$ of the first wavelength. Note that there is the above-mentioned advantage as to the return magnification M, but in reality, as shown in FIG. 10C, the second-wavelength and third-wavelength optical beams are input to the collimator lens 37 in a convergent state with the return optical system, so the first-wavelength through third-wavelength optical beams can be condensed on the same condensed positions $P_{m1}$, $P_{m2}'$, and $P_{m3}'$, i.e., the same light receiving face.

Thus, a lens material having high-dispersion properties is selectively employed as the material of the multi lens 42, which is disposed on the return optical system, thereby providing a magnification difference of the return magnifications between the first wavelength, and the second and third wavelengths for adapting the focus capture range to each format. With the multi lens 42, a device for providing a magnification difference is disposed only on the return optical system, and accordingly, the stroke amount of the collimator lens 37 does not have to be expanded, which is advantageous as an optical system, and also reduction in size can be realized.

Figure 11:
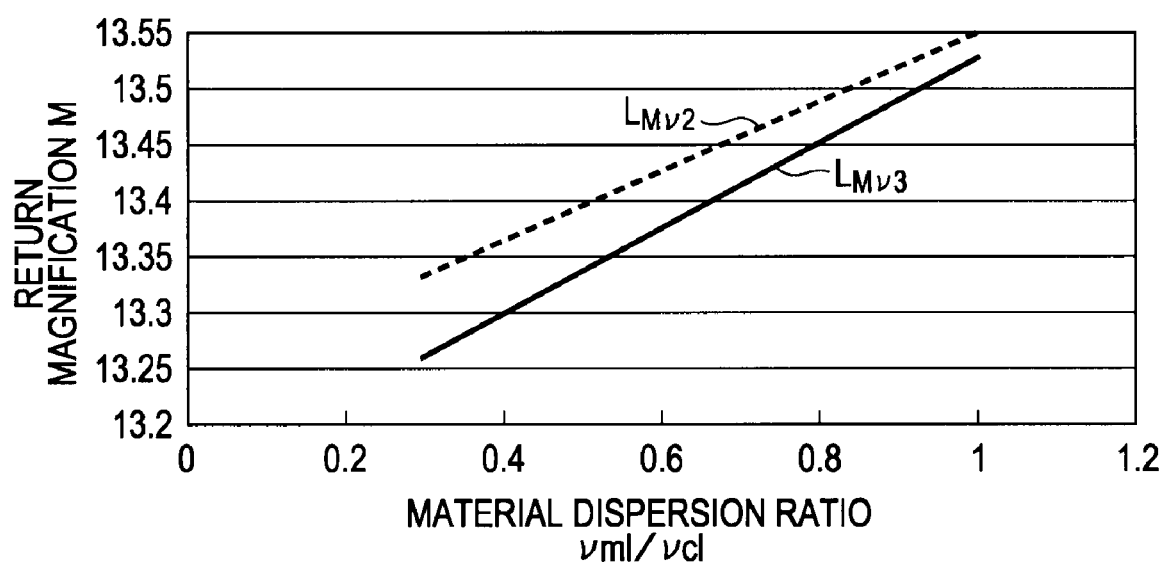
FIG. 11 is a diagram for describing a state in the case of changing the value of the material dispersion making up the multi lens with the optical pickup to which an embodiment of the present invention has been applied, and is a diagram illustrating change in a return magnification as to change in the material dispersion ratio (vml/vcl) between the collimator lens and multi lens.
Figure 12:
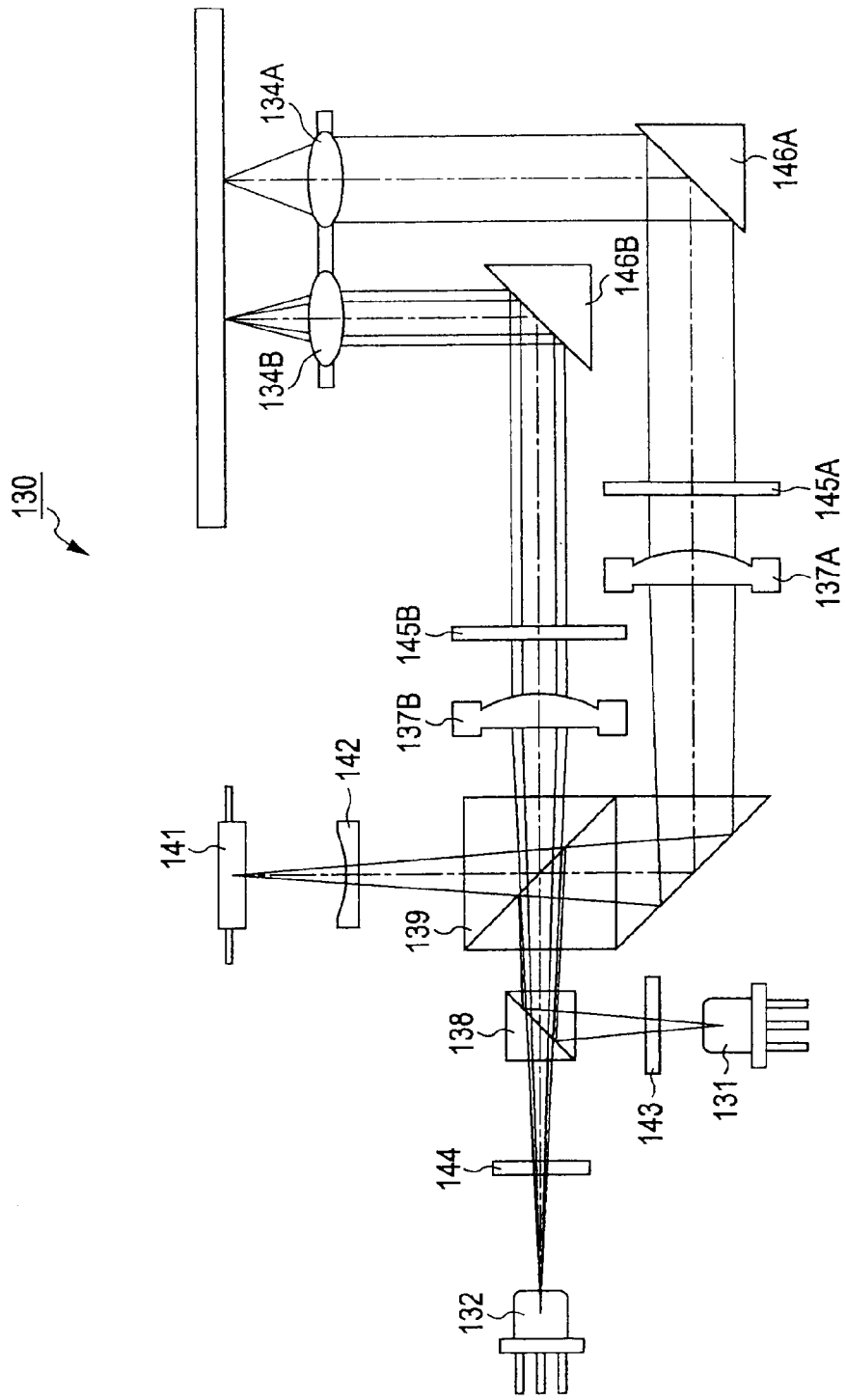
FIG. 12 is a diagram illustrating an example of the optical system of the optical pickup according to the related art, and is an optical path diagram illustrating an example including multiple objective lenses.
Figure 13:
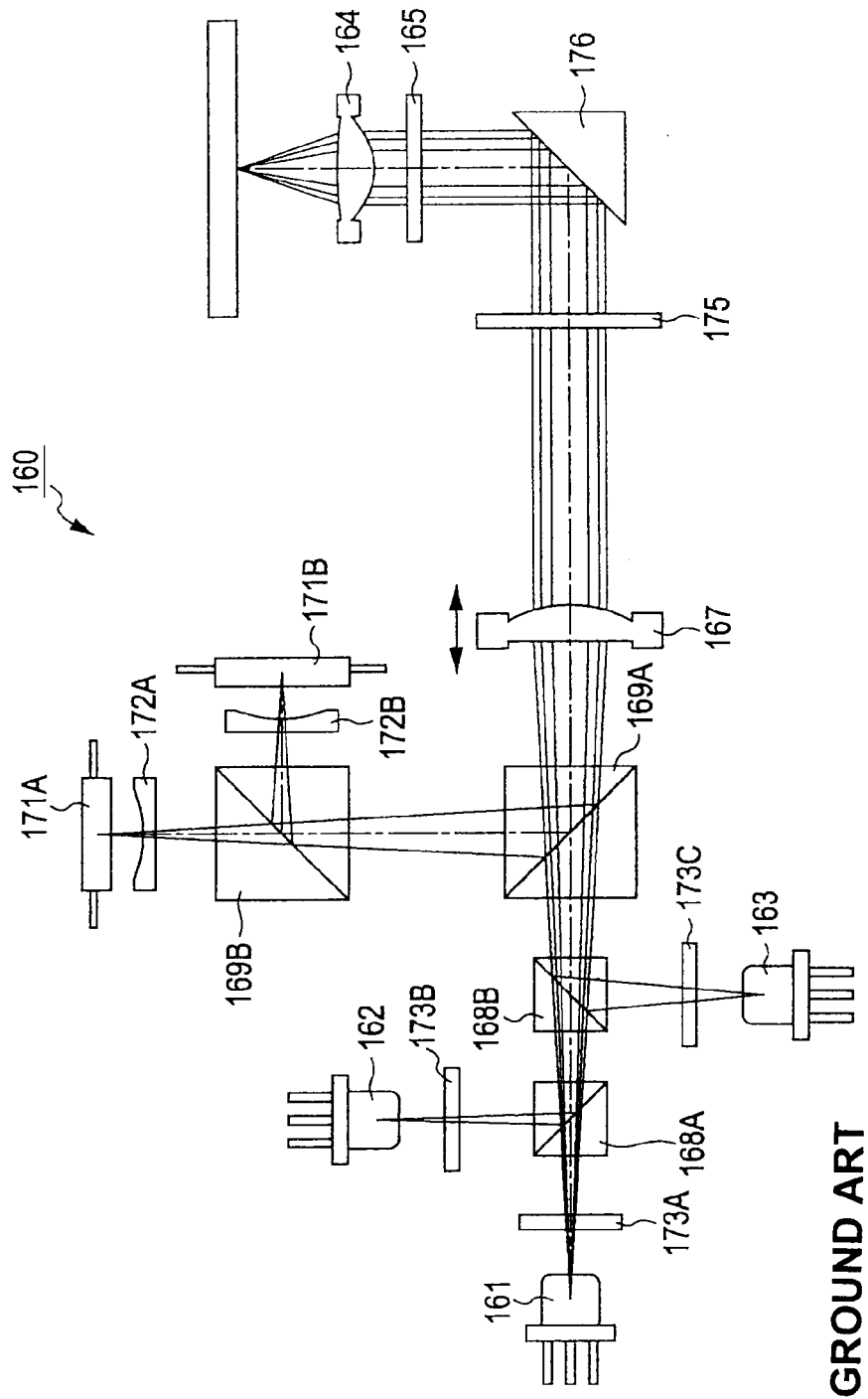
FIG. 13 is a diagram illustrating an example of the optical system of the optical pickup according to the related art, and is an optical path diagram illustrating an example including multiple light receiving elements.

Now, as an example in a case wherein the value of the material dispersion of a material making up the multi lens 42, in a case wherein the incident magnifications $m_2$ and $m_3$ as to the condensing optical device 36 of the second-wavelength and third-wavelength optical beams shown in FIGS. 7A through 7C and Table 2 are $m_2$, $m_3$=−1/60, change in the return magnification as to the second-wavelength and third-wavelength optical beams when changing the material making up the multi lens 42 from a material having the same Abbe's number (vd=64.1) as the collimator lens 37 to a material having an Abbe's number vd=18.9 so as to obtain a high-dispersion material is illustrated in FIG. 11, and also the same respective numeric values as those shown in Tables 1 through 4 in a case wherein the Abbe's number of the multi lens 42 is set to vd=64.1, 18.9 are shown in Tables 5 and 6, respectively.

TABLE 5

INCIDENT MAGNIFICATIONS $m_2$ and $m_3$ = −1/60 vd = 64.1

|  | THIRD WAVE-LENGTH | SECOND WAVE-LENGTH | FIRST WAVE-LENGTH |
|---|---|---|---|
| FOCAL LENGTH OF OBJECTIVE LENS | 2.35 | 2.30 | 2.20 |
| INCIDENT MAGNIFICATION | −1/60 | −1/60 | 0 |
| OUTGOING MAGNIFICATION | 9.13 | 9.13 | 10.00 |
| RETURN MAGNIFICATION M | 13.53 | 13.55 | 15.00 |
| STROKE AMOUNT | −1.84 | −2.70 | 0.00 |
| SIGMOID p-p | 4.18 | 4.11 | 3.00 |

TABLE 6

INCIDENT MAGNIFICATIONS $m_2$ and $m_3$ = −1/60 vd = 18.9

|  | THIRD WAVE-LENGTH | SECOND WAVE-LENGTH | FIRST WAVE-LENGTH |
|---|---|---|---|
| FOCAL LENGTH OF OBJECTIVE LENS | 2.35 | 2.30 | 2.20 |
| INCIDENT MAGNIFICATION | −1/60 | −1/60 | 0 |
| OUTGOING MAGNIFICATION | 9.11 | 9.12 | 10.00 |
| RETURN MAGNIFICATION M | 13.26 | 13.33 | 15.00 |
| STROKE AMOUNT | −1.84 | −2.70 | 0.00 |
| SIGMOID p-p | 4.35 | 4.25 | 3.00 |

Note here that the horizontal axis in FIG. 11 denotes vml/vcl as a material dispersion ratio, the vertical axis denotes the return magnification M of the second and third wavelengths, a dashed line $L_{Mv2}$ indicates change in the return magnification $M_2$ corresponding to the second wavelength when changing the material dispersion (Abbe's number) of the multi lens 42, and a solid line $L_{Mv3}$ indicates change in the return magnification $M_3$ corresponding to the third wavelength when changing the material dispersion (Abbe's number) of the multi lens 42. Note that in FIG. 11, the return magnifications $M_2$ and $M_3$ corresponding to the second and third wavelengths are calculated assuming that the return magnification $M_1$ corresponding to the first wavelength does not change from 15.00 even when changing the material dispersion (Abbe's number) of the multi lens 42.

As shown in FIG. 11 and Tables 5 and 6, the material dispersion of the multi lens 42 is set greater (Abbe's number vml is set to small), and as the material dispersion ratio (vml/vcl) indicating the ratio of the material dispersion (1/vcl) of the collimator lens 37 as to the material dispersion (1/vml) of the multi lens 42 gets smaller, the return magnifications $M_2$ and $M_3$ corresponding to the second and third wavelengths can be set smaller, and thus, can be set sufficiently smaller as compared to the fixed return magnification $M_1$ corresponding to the first wavelength, and accordingly, the focus capture range can be set to a suitable value. That is to say, for example, as described above with reference to Tables 1 through 4 and FIGS. 7A through 7C, according to an arrangement wherein the incident magnifications $m_1$, $m_2$, and $m_3$ as to the condensing optical device 36 are set to a suitable range, the return magnifications $M_2$ and $M_3$ corresponding to the second and third wavelengths can be set small such as $M_2$=13.55, and $M_3$=13.53 (see Table 5) as compared to the return magnification $M_1$ corresponding to the first wavelength, and additionally, for example, as shown in Table 6, according to an arrangement wherein the material dispersion (1/vml) of the multi lens 42 is set greater, further the return magnifications $M_2$ and $M_3$ corresponding to the second and third wavelengths can be set smaller such as $M_2$=13.33, and $M_3$=13.26, and thus, the focus capture range can be set to a more appropriate value by setting the magnification difference as to the return magnification $M_1$ corresponding to the first wavelength greater.

The detector 41 includes the light receiving unit 40, receives the return first-wavelength through third-wavelength optical beams condensed by the multi lens 42 at the common light receiving unit 40, and detects various types of detection signals such as a focus error signal, tracking error signal, or the like as well as an information signal.

The optical pickup 3 thus configured drives and moves the objective lens 34 based on the focus error signal and tracking error signal obtained at the detector 41, and accordingly, the objective lens 34 is moved to a focus position as to the signal recording face of the optical disc 2, the optical beam is focused on the signal recording face of the optical disc 2, and recording or playback of information as to the optical disc 2 is performed.

The optical pickup 3 includes the first through third emission units for emitting the first-wavelength through third-wavelength optical beams, the objective lens 34 making up the condensing optical device 36 for condensing the first-wavelength through third-wavelength optical beams emitted from the first through third emission units on the signal recording face of the optical disc, and the diffraction unit 50 provided on one of the faces of the diffraction optical device 35 disposed on the optical paths of the first-wavelength through third-wavelength optical beams. The diffraction unit 50 includes the first through third diffraction areas 51, 52, and 53, the first through third diffraction areas 51, 52, and 53 are configured so as to have a different diffraction configuration having a circular zone shape and a predetermined depth, and so as to have the first through third diffraction configurations for generating diffraction light of a predetermined diffraction order so as to be dominant as to each wavelength optical beam, thereby enabling the corresponding optical beam to be condensed on the signal recording face of each of the three types of optical discs employing a different wavelength by using a single shared objective lens 34 in an appropriate manner, realizing three-wavelength compatibility with the objective lens 34 as common without complicating the configuration, and realizing recording and/or playback of an information signal as to each of the optical discs.

Note here that three-wavelength compatibility with the objective lens as common has been realized by configuring the condensing optical device 36 making up the optical pickup 3 from the objective lens 34, diffraction optical device 35 including the diffraction unit 50 for reducing the aberration of each wavelength optical beam to be condensed on an optical disc by the objective lens 34, which is provided on a position on the incident side of the optical beam to be condensed on the optical disc by the objective lens 34. However, the condensing optical device 36 making up the optical pickup 3 is not restricted to this, and accordingly may be configured of the objective lens 34B having a diffraction configuration for reducing the aberration of each wavelength optical beam as the diffraction unit 50 on one of the faces thereof, and this case enables further simplification of the configuration and reduction in size. Also, reduction in aberration has been realized here by the diffraction unit 50 having three circular members on a so-called one face made up of the first through third diffraction areas 51, 52, and 53, but the configuration of the diffraction unit 50 is not restricted to this, and for example, the same function as the diffraction unit 50 may be provided by a diffraction configuration provided on both faces of the optical device, but the above-mentioned configuration wherein the diffraction unit 50 is provided is advantageous from the perspective of reduction in size of the device, simplification of the configuration, and further improvement in optical use efficiency, omission of an adjustment process, and so forth.

As described above, the optical pickup 3 can provide the optimal diffraction efficiency and diffraction angle for each area to each wavelength optical beam by the diffraction unit 50 provided on one of the faces of the diffraction optical device 35 making up the condensing optical device 36, can sufficiently reduce spherical aberration on the signal recording faces of the three types of the first through third optical discs 11, 12, and 13 having a different format such as the thickness of the protection layer, or the like, enables reduction in size of the device, and simplification of the configuration by employing an optical component in common, such as the objective lens 34 or the like, and enables reading and writing a signal as to the multiple types of the optical discs 11, 12, and 13 by employing optical beams of different three wavelengths.

Further, the optical pickup 3 includes the collimator lens 37, which can be moved in the optical axis direction, serving as a divergence angle transformation device for transforming the divergence angle of each wavelength optical beam so as to obtain a predetermined divergence angle according to the moved position in the optical axis direction, the condensing optical device 36 is configured so as to condense the first-wavelength optical beam converted into approximate parallel light by the collimator lens 37 on the signal recording face of the first optical disc in an appropriate manner, condense the second-wavelength optical beam converted into predetermined diffusion light by the collimator lens 37 on the signal recording face of the second optical disc in an appropriate manner, and condense the third-wavelength optical beam converted into predetermined diffusion light by the collimator lens 37 on the signal recording face of the third optical disc in an appropriate manner, the optical magnification of the return system can be optimized according to a use wavelength, i.e., the return magnifications $M_2$ and $M_3$ corresponding to the second and third wavelengths which are use wavelengths of the second and third optical discs can be reduced as compared to the return magnification $M_1$ which is the use wavelength of the first optical disc, whereby the suitable focus capture range corresponding to each optical disc format can be set with the optical system for condensing the corresponding wavelength optical beam on each optical disc by employing the common optical system including the common condensing optical device 36 and common light receiving unit 40 corresponding to the three types of use wavelengths, detecting the reflected light from each optical disc, and performing recording/playback of an information signal as to the multiple types of optical discs, and accordingly, suitable recording and/or playback is realized as to each optical disc. Subsequently, the optical pickup 3 sets the focus capture range to a desired range, thereby realizing high-reliability recording/playback without making a significant change to the existing system.

Thus, the optical pickup 3 realizes suitable three-wavelength compatibility including a focus capture range and so forth by the common objective lens 34 and common light receiving unit 40, employs the optical components of the objective lens 34 and detector 41 in common use to reduce the number of components, realizes the common use of various types of optical components disposed on the optical path between the objective lens 34 and detector 41, realizes reduction in size and reduction in cost, and enables the properties as the optical pickup to be improved by preventing influence in a case of there are property irregularities for each of the components provided for each wavelength according to common use of a component, or the like.

Also, the optical pickup 3 realizes three-wavelength compatibility by the single objective lens 34, thereby eliminating a problem such that the sensitivity of the actuator deteriorates, and a problem such as deterioration in properties in a case wherein there is an error regarding the attachment angles of the respective objective lenses as to the actuator, which are problems in the case of employing multiple objective lenses, and realizing appropriate recording and playback properties. Also, the optical pickup 3 realizes three-wavelength compatibility by the single light receiving unit 40, thereby eliminating a problem such that a configuration laying wiring multiple times becomes complex or prevents reduction in size, which is a problem in the case of employing multiple light receiving elements, and realizing a simple configuration and reduction in size. Further, the optical pickup 3 reduces components as a whole such as described above, thereby reducing adjustment processes used for manufacturing to realize simplification of manufacturing and reduction in cost.

Incidentally, the above-mentioned diffraction optical device 35 including the diffraction unit 50, and objective lens 34 of the optical pickup 3 serve as the condensing optical device 36 for condensing an input optical beam on a predetermined position, such as described above. With the above description, an arrangement has been made wherein the diffraction optical device 35 where the diffraction unit 50 is provided, and objective lens 34, which make up the condensing optical device 36, are provided in the actuator such as an objective lens driving mechanism or the like for driving the objective lens 34 so as to be integral with each other, but the diffraction optical device 35 and objective lens 34 may be configured as a condensing optical unit wherein the diffraction optical device 35 and objective lens 34 are integrated in a unit manner to enhance attachment precision at the time of attaching the actuator to the lens holder, and simplify attachment. For example, the diffraction optical device 35 and objective lens 34 can be configured in an integral manner by being fixed by the holder while matching the position, interval, and optical axis using a spacer or the like, and according to this configuration, an adjustment process can be simplified, adjustment of the diffraction unit 50 and objective lens 34 can be performed with high precision, and accordingly, the properties as the optical pickup can be improved.

Next, description will be made with reference to FIG. 2 regarding the optical path of an optical beam emitted from each emission unit of the first and second light source units 31 and 32 with the optical pickup 3 configured such as described above. First, description will be made regarding an optical path when emitting the first-wavelength optical beam to the first optical disc 11 to perform reading or writing of information.

The disc-type determining unit 22, which has determined that the type of the optical disc 2 is the first optical disc 11, controls the first emission unit of the first light source unit 31 to emit the first-wavelength optical beam.

The first-wavelength optical beam emitted from the first emission unit is divided into three beams to detect a tracking error signal or the like by the first grating 43, and these beams are input to the first beam splitter 38. The first-wavelength optical beams input to the first beam splitter 38 are reflected at the separating face 38a thereof, and are output to the second beam splitter 39 side.

The first-wavelength optical beams input to the second beam splitter 39 are transmitted to the synthetic separating face 39a, emitted to the collimator lens 37 side, converted into approximate parallel light by the collimator lens 37 through conversion of the divergence angles thereof, added with a predetermined phase difference by the ¼ wavelength plate 45, reflected at the redirecting mirror 46, and emitted to the diffraction optical device 35 side of the condensing optical device 36. At this time, the collimator lens 37 is moved to a first position by the collimator lens driving unit 47, and emits the first-wavelength optical beams in an approximate parallel light state, and in other words, the incident magnification $m_1$ as to the condensing optical device 36 is controlled so as to obtain $m_1=0$.

The first-wavelength optical beams input to the diffraction optical device 35 are passed through each of the first through third diffraction areas 51, 52, and 53 of the diffraction unit 50 provided on the incident side face thereof, emitted such that a predetermined diffraction order becomes dominant, and are input to the objective lens 34 of the condensing optical device 36. Note that the first-wavelength optical beams emitted from the diffraction optical device 35 are set to not only a predetermined divergence angle state but also a state under predetermined aperture control.

The first-wavelength optical beams input to the objective lens 34, i.e., the optical beams passed through each of the areas 51, 52, and 53 are input in a divergence angle state such that spherical aberration can be reduced, and accordingly are condensed on the signal recording face of the first optical disc 11 by the objective lens 34 in an appropriate manner.

The optical beams condensed on the first optical disc 11 are reflected at the signal recording face, passed through the objective lens 34, diffraction optical device 35, redirecting mirror 46, ¼ wavelength plate 45, and collimator lens 37, transmitted to the synthetic separating face 39a of the second beam splitter 39, transmitted to the separating face 38a of the first beam splitter 38, and emitted to the multi lens 42 side.

The first-wavelength optical beams branched from the optical path of the outgoing optical beam are added with astigmatism and predetermined refractive power by the multi lens 42, converged on the light receiving face of the light receiving unit 40 of the detector 41, and detected. At this time, the return magnification $M_1$ in the return optical system from the first optical disc is set to a value greater than those of later-described return magnifications $M_2$ and $M_3$ since the above-mentioned incident magnification $m_1$ is arranged to be a predetermined value, and the condensing optical device 36 is arranged to condense in this state in an appropriate manner.

Next, description will be made regarding the optical path when emitting the second-wavelength optical beam to the second optical disc 12 to perform reading or writing of information.

The disc-type determining unit 22, which has determined that the type of the optical disc 2 is the second optical disc 12, controls the second emission unit of the second light source unit 32 to emit the second-wavelength optical beam.

The second-wavelength optical beam emitted from the second emission unit is divided into three beams to detect a tracking error signal or the like by the first grating 44, and these beams are input to the second beam splitter 39. The second-wavelength optical beams input to the second beam splitter 39 are reflected at the synthetic separating face 39a thereof, and are emitted to the collimator lens 37 side, converted into diffusion light with a predetermined divergence angle by the collimator lens 37 through conversion of the divergence angles thereof, added with a predetermined phase difference by the ¼ wavelength plate 45, reflected at the redirecting mirror 46, and emitted to the diffraction optical device 35 side of the condensing optical device 36. At this time, the collimator lens 37 is moved to a second position by the collimator lens driving unit 47, and emits the second-wavelength optical beams in a diffusion light state having a predetermined divergence angle, and in other words, the incident magnification $m_2$ as to the condensing optical device 36 is controlled so as to satisfy $-\frac{1}{40} \leq m_2 \leq -\frac{1}{200}$.

The second-wavelength optical beams input to the diffraction optical device 35 are passed through each of the first through third diffraction areas 51, 52, and 53 of the diffraction unit 50 provided on the incident side face thereof, emitted such that a predetermined diffraction order becomes dominant, and are input to the objective lens 34 of the condensing optical device 36. Note that the second-wavelength optical beams emitted from the diffraction optical device 35 are set to not only a predetermined divergence angle state but also a state in which aperture control effects are obtained by inputting to the objective lens 34.

The second-wavelength optical beams input to the objective lens 34, i.e., the optical beams passed through each of the areas 51, 52, and 53 are input in a divergence angle state such that spherical aberration can be reduced, and accordingly are condensed on the signal recording face of the second optical disc 12 by the objective lens 34 in an appropriate manner.

The return optical path of the optical beams reflected at the signal recording face of the second optical disc 12 is the same as that in the case of the first-wavelength optical beams, so description thereof will be omitted. However, at this time, the return magnification $M_2$ in the return optical system from the second optical disc is set to a value smaller than that of the above-mentioned return magnification $M_1$ since the above-mentioned incident magnification $m_2$ is arranged to be a predetermined value, and the condensing optical device 36 is arranged to condense in this state in an appropriate manner.

Next, description will be made regarding the optical path when emitting the third-wavelength optical beam to the third optical disc 13 to perform reading or writing of information.

The disc-type determining unit 22, which has determined that the type of the optical disc 2 is the third optical disc 13, controls the third emission unit of the second light source unit 32 to emit the third-wavelength optical beam.

The third-wavelength optical beam emitted from the third emission unit is divided into three beams to detect a tracking error signal or the like by the second grating 44, and these beams are input to the second beam splitter 39. The third-wavelength optical beams input to the second beam splitter 39 are reflected at the synthetic separating face 39a thereof, and are emitted to the collimator lens 37 side, converted into diffusion light with a predetermined divergence angle by the collimator lens 37 through conversion of the divergence angles thereof, added with a predetermined phase difference by the ¼ wavelength plate 45, reflected at the redirecting mirror 46, and emitted to the diffraction optical device 35 side of the condensing optical device 36. At this time, the collimator lens 37 is moved to a third position by the collimator lens driving unit 47, and emits the third-wavelength optical beams in a diffusion light state having a predetermined divergence angle, and in other words, the incident magnification $m_3$ as to the condensing optical device 36 is controlled so as to satisfy $-\frac{1}{40} \leq m_3 \leq -\frac{1}{200}$.

The third-wavelength optical beams input to the diffraction optical device 35 are passed through each of the first through third diffraction areas 51, 52, and 53 of the diffraction unit 50 provided on the incident side face thereof, emitted such that a predetermined diffraction order becomes dominant, and are input to the objective lens 34 of the condensing optical device 36. Note that the third-wavelength optical beams emitted from the diffraction optical device 35 are set to not only a predetermined divergence angle state but also a state in which aperture control effects are obtained by inputting to the objective lens 34.

The third-wavelength optical beams input to the objective lens 34, i.e., the optical beams passed through the first diffraction area 51 are input in a divergence angle state such that spherical aberration can be reduced, and accordingly are condensed on the signal recording face of the third optical disc 13 by the objective lens 34 in an appropriate manner.

The return optical path of the optical beams reflected at the signal recording face of the third optical disc 13 is the same as that in the case of the first-wavelength optical beams, so description thereof will be omitted. However, at this time, the return magnification $M_3$ in the return optical system from the third optical disc is set to a value smaller than that of the above-mentioned return magnification $M_1$ since the above-mentioned incident magnification $m_3$ is arranged to be a predetermined value, and the condensing optical device 36 is arranged to condense in this state in an appropriate manner.

The optical pickup 3 to which an embodiment of the present invention has been applied includes the first through third emission units for emitting the first-wavelength through third-wavelength optical beams, the condensing optical device 36 for condensing each of the first-wavelength through third-wavelength optical beams emitted from the first through third emission units on the signal recording face of the corresponding optical disc, the collimator lens 37, which can be moved in the optical axis direction, serving as a divergence angle transformation device for transforming the divergence angles of the first-wavelength through third-wavelength optical beams according to the moved position in the optical axis direction so as to obtain a predetermined divergence angle, the first beam splitter 38 and second beam splitter 39 serving as optical path separating units for separating the optical paths of the return first-wavelength through third-wavelength optical beams reflected at the optical discs from the optical path of each optical beam emitted from the first through third emission units, and the detector 41 including the light receiving unit 40, which are common between three wavelengths, for receiving the return first-wavelength through third-wavelength optical beams separated from each outgoing optical beam by the first beam splitter 38 and second beam splitter 39 with the condensing optical device 36 condensing the first-wavelength optical beams of which the divergence angles are transformed to approximate parallel light by the collimator lens 37 on the signal recording face of the first optical disc in an appropriate manner, condensing the second-wavelength optical beams of which the divergence angles are transformed to diffusion light with a divergence angle by the collimator lens 37 on the signal recording face of the second optical disc in an appropriate manner, and condensing the third-wavelength optical beams of which the divergence angles are transformed to diffusion light with a divergence angle by the collimator lens 37 on the signal recording face of the third optical disc in an appropriate manner. According to such an arrangement, the optical pickup 3 condenses the corresponding wavelength optical beam to each optical disc by employing the common optical system including the common condensing optical device 36 and common light receiving unit 40 corresponding to such three types of use wavelengths, detects the reflected light from the optical disc, achieves reduction in size of the device, and simplification of the configuration, further enables recording and/or playback of an information signal as to the multiple types of optical discs, optimizes the optical magnification (return magnification) of the return system according the each of use wavelengths in such a common optical system, thereby enabling the focus capture range corresponding to each optical disc format to be set, and enabling compatibility as to each optical disc to be exhibited, and accordingly, realizing simplification of the configuration, and reduction in size of the device, exhibiting compatibility as to each optical device, and realizing appropriate recording and/or playback.

Also, the optical pickup 3 is configured wherein according to the collimator lens 37 and collimator lens driving unit 47, the first-wavelength optical beam is input to the condensing optical device 36 such that the incident magnification $m_1$ as to the condensing optical device 36 satisfies a relational expression of $m_1=0$, the second-wavelength optical beam is input to the condensing optical device 36 such that the incident magnification $m_2$ as to the condensing optical device 36 satisfies a relational expression of $-1/40 \leq m_2 \leq -1/200$, and the third-wavelength optical beam is input to the condensing optical device 36 such that the incident magnification $m_3$ as to the condensing optical device 36 satisfies a relational expression of $-1/40 \leq m_3 \leq -1/200$. For example, the condensing optical device 36 made up of the objective lens 34 and diffraction optical device 35 is configured so as to condense each of the respective wavelength optical beams of which the incident magnifications are $m_1$, $m_2$, and $m_3$ on the signal recording face of the corresponding optical disc in a state in which spherical aberration is reduced, whereby the return magnifications $M_2$ and $M_3$ corresponding to the second and third wavelengths can be sufficiently reduced as compared to the return magnification $M_1$ corresponding to the first wavelength, and accordingly, setting of the focus capture range corresponding to each optical disc format is realized. Thus, the optical pickup 3 realizes simplification of the configuration, and reduction in size of the device, exhibits compatibility as to each optical disc, and realizes appropriate recording and/or playback.

Also, with the optical pickup 3, the multi lens 42 for converting the divergence angles of the return first-wavelength through third-wavelength optical beams and condensing these on the light receiving unit 40 is provided between the first beam splitter 38 and light receiving unit 40, and the materials making up the collimator lens 37 and multi lens 42 are determined such that the material dispersion 1/vcl of the material making up the collimator lens 37, and the material dispersion 1/vml making up the multi lens 42 satisfy a relational expression of (vml/vcl)≦1, so when assuming that the focal lengths as to the respective wavelengths the virtual complex lens 49 wherein the collimator lens 37 and multi lens 42 are virtually combined are $S_{cm1}$, $S_{cm2}$, and $S_{cm3}$, a relation of $S_{cm1} > S_{cm2}$, $S_{cm3}$ can be obtained, whereby the return magnification $M_2$ and $M_3$ corresponding to the second and third wavelengths can be reduced as compared to the return magnification $M_1$ corresponding to the first wavelength, and accordingly, setting of the focus capture range corresponding to each optical disc format is realized. Thus, the optical pickup 3 realizes simplification of the configuration, and reduction in size of the device, exhibits compatibility as to each optical disc, and realizes appropriate recording and/or playback.

Also, according to an arrangement wherein the first emission unit is disposed in the first light source unit 31, the second and third emission units are disposed in the second light source unit 32 disposed in a position different from the first light source unit 31, and the second and third emission units are disposed such that each emission point is positioned within the same plane orthogonal to the optical axes of the optical beams emitted from the second and third emission units, the optical pickup 3 realizes further simplification of components, and reduction in size of the device as compared to the case wherein the second and third emission units are disposed differently, realizes compatibility of the optical systems by employing the above-mentioned movable collimator lens 37 together, and also the emission unit for emitting the first-wavelength optical beam, and the emission unit for emitting the second-wavelength and third-wavelength optical beams are disposed in a different position, thereby enabling an arrangement wherein the magnification difference of the return magnifications such as described above.

Also, with the optical pickup 3 to which an embodiment of the present invention has been applied, the objective lens 34 can be employed in common as to three wavelengths, whereby occurrence of a problem such as deterioration in sensitivity due to increase in the weight of a movable portion of the actuator can be prevented. Also, the optical pickup 3 to which an embodiment of the present invention has been applied can sufficiently reduce spherical aberration which causes a problem in the case of employing the common objective lens 34 at the time of three-wavelength compatibility by the diffraction unit 50 provided on one face of the optical device, and accordingly can prevent a problem such as position adjustment between the respective diffraction units, deterioration in diffraction efficiency due to providing multiple diffraction units, or the like in the case of providing a diffraction unit for reduction in spherical aberration on multiple faces such as the related art, i.e., realizes simplification of an assembly process and improvement in optical use efficiency. Also, the optical pickup 3 to which an embodiment of the present invention has been applied enables an arrangement wherein the diffraction unit 50 is provided on one face of the optical device such as described above, thereby enabling an arrangement wherein the objective lens 34B including the diffraction unit 50 is provided instead of the objective lens 34 and diffraction optical device 35, and according to an arrangement wherein the diffraction unit 50 is integral with an objective lens, thereby realizing reduction in the weight of the movable portion of the actuator, simplification of an assembly process, and improvement in optical use efficiency.

Further, the optical pickup 3 to which an embodiment of the present invention has been applied can not only realize three-wavelength compatibility by the diffraction unit 50 provided on one face of the above-mentioned diffraction optical device 35, but also perform aperture control with numeric aperture corresponding to the three types of optical discs, and optical beams of three types of wavelengths, thereby eliminating providing of an aperture control filter or the like which has been employed in the related art, and adjustment at the time of disposing this, and further realizing simplification of the configuration, reduction in size, and reduction in cost.

The optical disc device 1 to which an embodiment of the present invention has been applied includes a driving unit for holding and rotationally driving an optical disc selected arbitrarily from the first through third optical discs, and an optical pickup for performing recording and/or playback of an information signal by selectively irradiating multiple optical beams of which the wavelengths differ to the optical disc rotationally driven by the driving unit, and employs the optical pickup 3 as this optical pickup, thereby enabling the corresponding optical beam to be condensed appropriately on the signal recording face of each of the three types of optical discs of which the use wavelengths differ using the common single objective lens 34 by the diffraction unit provided on one face of the optical device on the optical paths of the first-wavelength through third-wavelength optical beams, and realizing three-wavelength compatibility by employing the objective lens 34 in common use without complicating the configuration, and accordingly, enabling simplification of the configuration, and reduction in size, and realizing obtaining of appropriate recording and playback properties.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup configured to perform recording and/or playback of information by selectively irradiating a corresponding wavelength optical beam as to
    a first optical disc having a protection layer formed with first thickness,
    a second optical disc having a protection layer formed with second thickness which is thicker than said first thickness, and
    a third optical disc having a protection layer formed with third thickness which is thicker than said second thickness,
    said optical pickup comprising:
    a first emission unit configured to emit a first-wavelength optical beam corresponding to said first optical disc;
    a second emission unit configured to emit a second-wavelength optical beam which corresponds to said second optical disc, the second wavelength being longer than said first wavelength;
    a third emission unit configured to emit a third-wavelength optical beam which corresponds to said third optical disc, the third wavelength being longer than said second wavelength;
    a condensing optical device configured to condense each of said first-wavelength through third-wavelength optical beams on a corresponding optical disc signal recording face;
    a divergence angle transformation device disposed in an optical path between said first through third emission units and said condensing optical device, configured to move in an optical axis direction, and configured to transform divergence angles of said first-wavelength through third-wavelength optical beams according to a moved position of the divergence angle transformation device in the optical axis direction so as to obtain a corresponding predetermined divergence angle;
    a detector having a common light receiving unit configured to receive return optical beams of said first-wavelength through third-wavelength optical beams reflected from corresponding optical discs, the detector having a light receiving point positioned in an axis which extends through a center of the divergence angle transformation device, and the detector being positioned at a different position than positions of the first, second, and third emission units; and
    a multi lens configured to transform the divergence angles of said first-wavelength through third-wavelength optical beams of said return optical beams to condense the return optical beams on said light receiving unit, the multi lens being provided between said divergence angle transformation device and said light receiving unit,
    wherein said condensing optical device is configured to condense said first-wavelength optical beam of which the divergence angle has been transformed into approximate parallel light by said divergence angle transformation device on a signal recording face of said first optical disc, condense said second-wavelength optical beam of which the divergence angle has been transformed into diffusion light with a corresponding predetermined divergence angle by said divergence angle transformation device on a signal recording face of said second optical disc, and condense said third-wavelength optical beam of which the divergence angle has been transformed into diffusion light with a corresponding predetermined divergence angle by said divergence angle transformation device on a signal recording face of said third optical disc, and
    said divergence angle transformation device and said multi lens are configured such that a material dispersion 1/vcl of a material making up said divergence angle transformation device, and a material dispersion 1/vml of a material making up said multi lens satisfy a relational expression of $(vml/vcl) \leq 1$.

2. The optical pickup according to claim 1, wherein said second-wavelength optical beam is input to said condensing optical device such that an incident magnification $m_2$ as to said condensing optical device satisfies a relational expression of $-1/40 \leq m_2 \leq -1/200$, and said third-wavelength optical beam is input to said condensing optical device such that an incident magnification $m_3$ as to said condensing optical device satisfies a relational expression of $-1/40 \leq m_3 \leq -1/200$.

3. The optical pickup according to claim 1, further comprising:
    an optical path separating unit configured to separate the return optical beams of said first-wavelength through third-wavelength optical beams reflected at the corresponding signal recording faces from the respective optical beams emitted from the first through third emission units.

4. The optical pickup according to claim 1, wherein said first emission unit is provided in a first light source unit,
    said second emission unit and said third emission unit are provided in a second light source unit disposed at a different position from said first light source unit, and
    said second emission unit and said third emission unit are disposed such that each emission point is disposed within a same plane orthogonal to an optical axis of the optical beams emitted from said second and third emission units.

5. The optical pickup according to claim 1, wherein said condensing optical device is an objective lens having a diffraction configuration which reduces aberration of each wavelength optical beam on at least one of the signal recording faces of the corresponding optical discs.

6. The optical pickup according to claim 1, wherein said condensing optical device includes,
    an objective lens, and
    a diffraction optical device, which is provided in a position on an incident side of an optical beam condensed on an optical disc by said objective lens, configured to reduce aberration of each wavelength optical beam condensed on a corresponding optical disc by said objective lens.

7. The optical pickup according to claim 1, wherein in a case in which said first-wavelength optical beam is input, said divergence angle transformation device is moved to a position where said optical beam is emitted by transforming the divergence angle of said optical beam so as to obtain parallel light, in a case in which said second-wavelength optical beam is input, said divergence angle transformation device is moved to a position where said optical beam is emitted by transforming the divergence angle of said optical beam so as to obtain diffusion light with a corresponding predetermined divergence angle, or in a case in which said third-wavelength optical beam is input, said divergence angle transformation device is moved to a position where said optical beam is emitted by transforming the divergence angle of said optical beam so as to obtain diffusion light with a corresponding predetermined divergence angle, and said condensing optical device is configured so as to condense each of said first-wavelength through third-wavelength optical beams transformed by said divergence angle transformation device so as to obtain a corresponding predetermined divergence angle on the corresponding optical disc signal recording face.

8. The optical pickup according to claim 1, wherein said second-wavelength optical beam is input to said condensing optical device such that an incident magnification $m_2$ as to said condensing optical device satisfies a relational expression of $-1/100 < m_2 \leq -1/200$, and said third-wavelength optical beam is input to said condensing optical device such that an incident magnification $m_3$ as to said condensing optical device satisfies a relational expression of $-1/100 < m_3 \leq -1/200$.

9. An optical disc device comprising:
driving means for holding and rotationally driving an optical disc selected from a first optical disc having a protection layer formed with first thickness, a second optical disc having a protection layer formed with second thickness which is thicker than said first thickness, and a third optical disc having a protection layer formed with third thickness which is thicker than said second thickness; and an optical pickup configured to perform recording and/or playback of an information signal by selectively irradiating a corresponding wavelength optical beam on an optical disc rotationally driven by said driving means,
wherein said optical pickup includes,
  a first emission unit configured to emit a first-wavelength optical beam corresponding to said first optical disc,
  a second emission unit configured to emit a second-wavelength optical beam which corresponds to said second optical disc, the second wavelength being longer than said first wavelength,
  a third emission unit configured to emit a third-wavelength optical beam which corresponds to said third optical disc, the third wavelength being longer than said second wavelength,
  a condensing optical device configured to condense each of said first-wavelength through third-wavelength optical beams on a corresponding optical disc signal recording face,
  a divergence angle transformation device disposed in an optical path between said first through third emission units and said condensing optical device, configured to move in an optical axis direction, and configured to transform divergence angles of said first-wavelength through third-wavelength optical beams according to a moved position of the divergence angle transformation device in the optical axis direction so as to obtain a corresponding predetermined divergence angle,
  a detector having a common light receiving unit configured to receive return optical beams of said first-wavelength through third-wavelength optical beams reflected from corresponding optical discs, the detector having a light receiving point positioned in an axis which extends through a center of the divergence angle transformation device, and the detector being positioned at a different position than positions of the first, second, and third emission units, and
  a multi lens configured to transform the divergence angles of said first-wavelength through third-wavelength optical beams of said return optical beams to condense the return optical beams on said light receiving unit, the multi lens being provided between said divergence angle transformation device and said light receiving unit,
wherein said condensing optical device is configured to condense said first-wavelength optical beam of which the divergence angle has been transformed into approximate parallel light by said divergence angle transformation device on a signal recording face of said first optical disc, condense said second-wavelength optical beam of which the divergence angle has been transformed into diffusion light with a corresponding predetermined divergence angle by said divergence angle transformation device on a signal recording face of said second optical disc, and condense said third-wavelength optical beam of which the divergence angle has been transformed into diffusion light with a corresponding predetermined divergence angle by said divergence angle transformation device on a signal recording face of said third optical disc, and
said divergence angle transformation device and said multi lens are configured such that a material dispersion 1/vcl of a material making up said divergence angle transformation device, and a material dispersion 1/vml of a material making up said multi lens satisfy a relational expression of $(vml/vcl) \leq 1$.

10. The optical disk device according to claim 9, wherein said second-wavelength optical beam is input to said condensing optical device such that an incident magnification $m_2$ as to said condensing optical device satisfies a relational expression of $-1/100 < m_2 \leq -1/200$, and said third-wavelength optical beam is input to said condensing optical device such that an incident magnification $m_3$ as to said condensing optical device satisfies a relational expression of $-1/100 < m_3 \leq -1/200$.

11. An optical disc device comprising:
a driving unit configured to hold and rotationally drive an optical disc selected from a first optical disc having a protection layer formed with first thickness, a second optical disc having a protection layer formed with second thickness which is thicker than said first thickness, and a third optical disc having a protection layer formed with third thickness which is thicker than said second thickness; and an optical pickup configured to perform recording and/or playback of an information signal by selectively irradiating a corresponding wavelength optical beam on an optical disc rotationally driven by said driving unit,
wherein said optical pickup includes,
  a first emission unit configured to emit a first-wavelength optical beam corresponding to said first optical disc,
  a second emission unit configured to emit a second-wavelength optical beam which corresponds to said second optical disc, the second wavelength being longer than said first wavelength,
  a third emission unit configured to emit a third-wavelength optical beam which corresponds to said third optical disc, the third wavelength being longer than said second wavelength,
  a condensing optical device configured to condense each of said first-wavelength through third-wavelength optical beams on a corresponding optical disc signal recording face, a divergence angle transformation device disposed in an optical path between said first through third emission units and said condensing optical device, configured to move in an optical axis direction, and configured to transform divergence angles of said first-wavelength through third-wavelength optical beams according to a moved position of the divergence angle transformation device in the optical axis direction so as to obtain a corresponding predetermined divergence angle, a detector having a common light receiving unit configured to receive return optical beams of said first-wavelength through third-wavelength optical beams reflected from corresponding optical discs, the detector having a light receiving point positioned in an axis which extends through a center of the divergence angle transformation device, and the detector being positioned at a different position than positions of the first, second, and third emission units, and a multi lens configured to transform the divergence angles of said first-wavelength through third-wavelength optical beams of said return optical beams to condense the return optical beams on said light receiving unit, the multi lens being provided between said divergence angle transformation device and said light receiving unit, wherein said condensing optical device is configured to condense said first-wavelength optical beam of which the divergence angle has been transformed into approximate parallel light by said divergence angle transformation device on a signal recording face of said first optical disc, condense said second-wavelength optical beam of which the divergence angle has been transformed into diffusion light with a corresponding predetermined divergence angle by said divergence angle transformation device on a signal recording face of said second optical disc, and condense said third-wavelength optical beam of which the divergence angle has been transformed into diffusion light with a corresponding predetermined divergence angle by said divergence angle transformation device on a signal recording face of said third optical disc, and said divergence angle transformation device and said multi lens are configured such that a material dispersion $1/vcl$ of a material making up said divergence angle transformation device, and a material dispersion $1/vml$ of a material making up said multi lens satisfy a relational expression of $(vml/vcl) \leq 1$.

12. The optical disk device according to claim 11, wherein said second-wavelength optical beam is input to said condensing optical device such that an incident magnification $m_2$ as to said condensing optical device satisfies a relational expression of $-1/100 < m_2 \leq -1/200$, and said third-wavelength optical beam is input to said condensing optical device such that an incident magnification $m_3$ as to said condensing optical device satisfies a relational expression of $-1/100 < m_3 \leq -1/200$.

* * * * *